(12) United States Patent
Dudley et al.

(10) Patent No.: US 12,259,579 B1
(45) Date of Patent: Mar. 25, 2025

(54) SINGLE PHOTON INTERCONNECT EMPLOYING LOW INDEX CLADDING SPOT SIZE CONVERTER

(71) Applicant: PsiQuantum, Corp., Palo Alto, CA (US)

(72) Inventors: Eric Dudley, Sacramento, CA (US); Stanley Burgos, Campbell, CA (US); Jin Yao, San Diego, CA (US)

(73) Assignee: PsiQuantum, Corp., Palo Alto, CA (US)

( * ) Notice: Subject to any disclaimer, the term of this patent is extended or adjusted under 35 U.S.C. 154(b) by 7 days.

(21) Appl. No.: 17/806,338

(22) Filed: Jun. 10, 2022

Related U.S. Application Data

(60) Provisional application No. 63/202,433, filed on Jun. 10, 2021.

(51) Int. Cl.
    *G02B 6/30*     (2006.01)

(52) U.S. Cl.
    CPC .................................... *G02B 6/305* (2013.01)

(58) Field of Classification Search
    CPC ........ G02B 6/305; G02B 6/1228; G02B 6/14; G02B 2006/12152; G02B 6/12002; G02B 6/12004; G02B 6/1223; G02B 6/136; G02B 6/30; G02B 2006/12061; G02B 2006/12147; G02B 2006/12195; G02F 1/0147

See application file for complete search history.

(56) References Cited

U.S. PATENT DOCUMENTS

| | | | |
|---|---|---|---|
| 6,866,426 B1 * | 3/2005 | Steinberg | G02B 6/423 |
| | | | 385/83 |
| 8,326,100 B2 | 12/2012 | Chen et al. | |
| 10,416,381 B1 * | 9/2019 | Chen | G02B 6/305 |

(Continued)

FOREIGN PATENT DOCUMENTS

| | | | | |
|---|---|---|---|---|
| JP | 2011123094 A | * | 6/2011 | |
| WO | WO-2021044517 A1 | * | 3/2021 | ......... G02B 6/12014 |

OTHER PUBLICATIONS

Machine translation of Description of JP-2011123094-A (Year: 2011).*

(Continued)

*Primary Examiner* — Daniel Petkovsek
*Assistant Examiner* — Emma R. Oxford
(74) *Attorney, Agent, or Firm* — Weaver Austin Villeneuve & Sampson LLP

(57) ABSTRACT

A device includes a spot size converter on a substrate. The substrate includes an optical fiber alignment structure formed thereon. The spot size converter is aligned with the optical fiber alignment structure. The spot size converter includes an oxide layer that has a first refractive index and includes a tapered section such that a first end of the spot size converter is smaller than a second end of the spot size converter. The spot size converter also includes a waveguide core in the oxide layer. The waveguide core is tapered and is smaller at the first end than at the second end of the spot size converter. The spot size converter further includes a cladding layer surrounding the oxide layer, the cladding layer having a second refractive index lower than the first refractive index of the oxide layer.

20 Claims, 24 Drawing Sheets

(56) References Cited

U.S. PATENT DOCUMENTS

| | | | | |
|---|---|---|---|---|
| 2003/0219208 | A1* | 11/2003 | Kwon | G02B 6/3692 |
| | | | | 385/49 |
| 2011/0116741 | A1* | 5/2011 | Cevini | G02B 6/305 |
| | | | | 385/28 |
| 2015/0023631 | A1* | 1/2015 | Shastri | B32B 38/0012 |
| | | | | 385/14 |
| 2015/0214122 | A1* | 7/2015 | Vermeulen | G01M 11/30 |
| | | | | 438/14 |
| 2016/0356960 | A1* | 12/2016 | Novack | G02B 6/1228 |
| 2017/0160481 | A1* | 6/2017 | Ling | G02B 6/305 |
| 2018/0003899 | A1* | 1/2018 | Doerr | G02B 6/4225 |
| 2018/0088275 | A1* | 3/2018 | Okayama | G02B 6/12007 |
| 2018/0113332 | A1* | 4/2018 | Kwack | G02F 1/2257 |
| 2018/0180818 | A1* | 6/2018 | Jiang | G02B 6/1228 |
| 2019/0187373 | A1* | 6/2019 | Shubin | G02B 6/305 |
| 2019/0384003 | A1* | 12/2019 | Painchaud | G02B 6/2821 |
| 2020/0225413 | A1* | 7/2020 | Lipson | G02B 6/305 |
| 2020/0393619 | A1* | 12/2020 | Mahalingam | G02B 6/1228 |
| 2022/0365285 | A1* | 11/2022 | Hickey | G02B 6/305 |

OTHER PUBLICATIONS

T. Kitamura et al., "Dual-core spot-size converter with tapered cladding layer designed for high-efficiency mode coupling to InP-based deep-ridge waveguide," 2014 IEEE Photonics Conference, San Diego, Ca, USA, 2014, pp. 280-281, doi: 10.1109/IPCon.2014. 6995353. (Year: 2014).*

R. Larrea, A. M. Gutierrez, A. Griol, A. Brimont and P. Sanchis, "Fiber-to-Chip Spot-Size Converter for Coupling to Silicon Waveguides in the O-Band," in IEEE Photonics Technology Letters, vol. 31, No. 1, pp. 31-34, 1 Jan. 1, 2019, doi: 10.1109/LPT.2018. 2881334. (Year: 2019).*

Machine translation of WO-2021044517-A1. (Year: 2021).*

Barwicz, T. et al., "Automated, Self-Aligned Assembly of 12 Fibers per Nanophotonic Chip with Standard Microelectronics Assembly Tooling", 2015 IEEE 65th Electronic Components and Technology Conference (ECTC), Jul. 2015, pp. 775-782.

Barwicz, T. et al., "Integrated Metamaterial Interfaces for Self-Aligned Fiber-to-Chip Coupling in Volume Manufacturing", IEEE Journal of Selected Topics in Quantum Electronics, May/Jun. 2019, vol. 25, No. 3, Art. 4700313, 13 pages.

Chen, L. et al., "Low-Loss and Broadband Cantilever Couplers Between Standard Cleaved Fibers and High-Index-Contrast $Si_3N_4$ or Si Waveguides", IEEE Photonics Technology Letters, Dec. 1, 2010, vol. 22, No. 23, pp. 1744-1746.

Wang, M. et al., "A Fiber-to-Waveguide Edge Coupler Assisted by Silicon-Nitride-Waveguide with Large Fabrication Tolerance", Seventh Symposium on Novel Photoelectronic Detection Technology and Applications, Proc. of SPIE, Mar. 12, 2021, vol. 11763, 11763H, pp. 1-6.

* cited by examiner

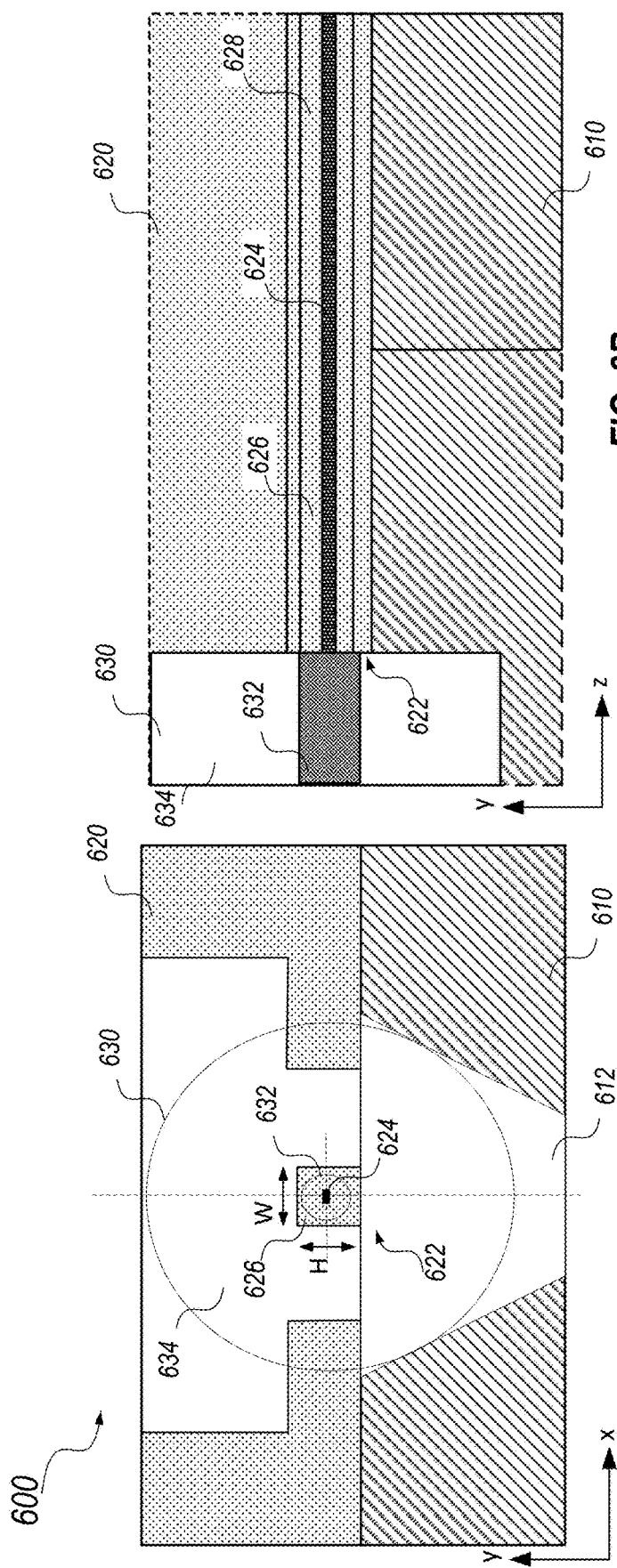
FIG. 6B
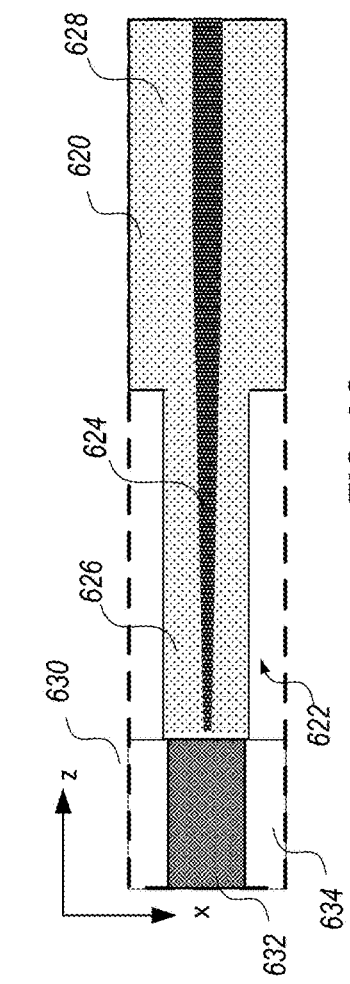
FIG. 6C
FIG. 6A

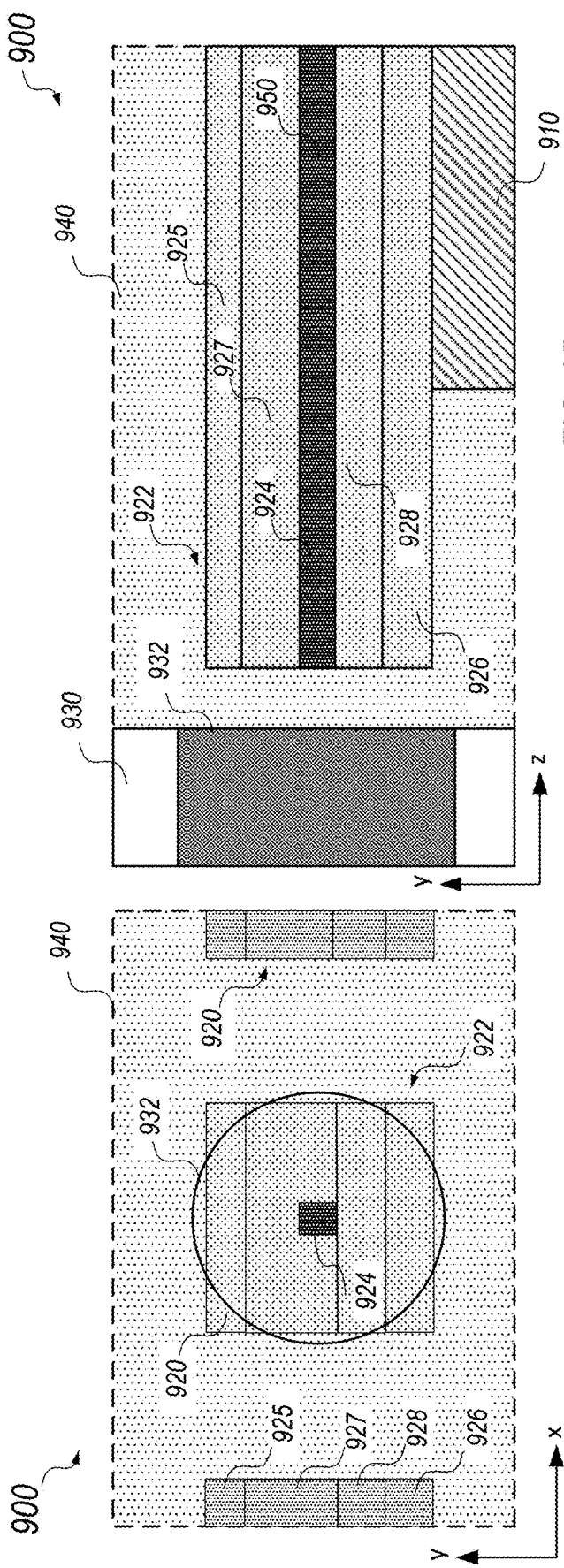
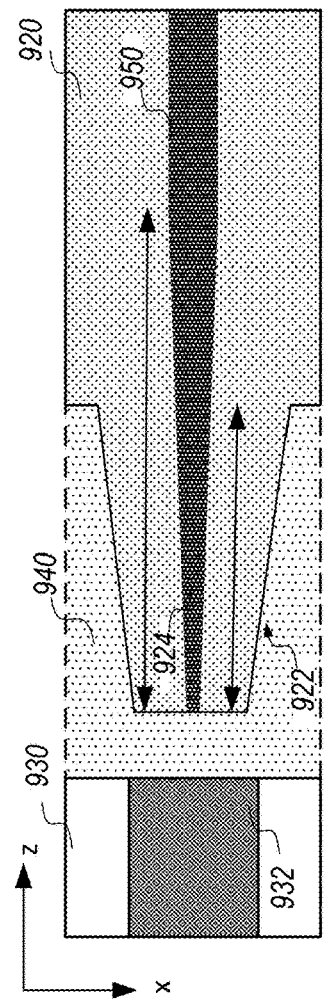
FIG. 9B
FIG. 9C
FIG. 9A

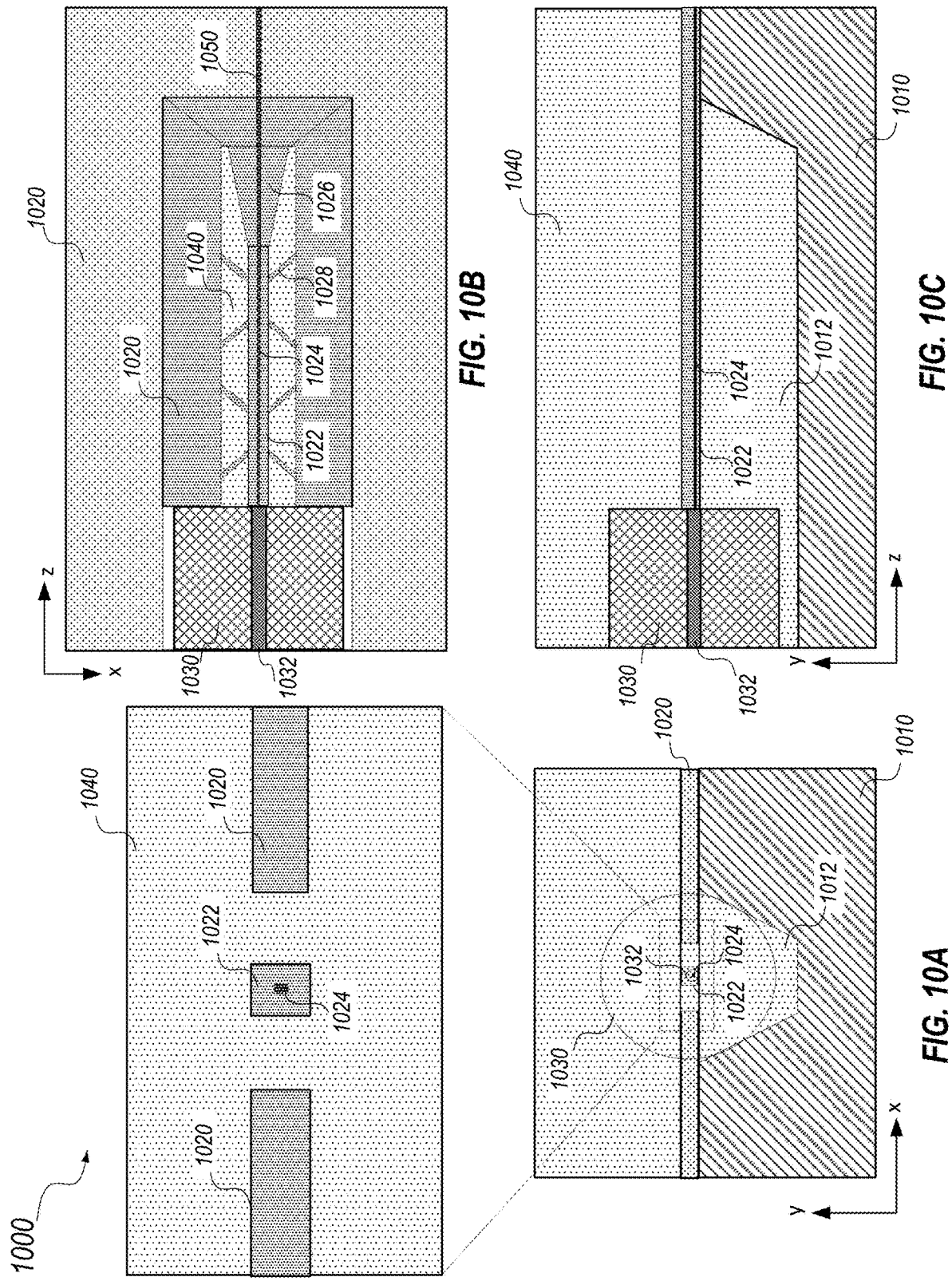

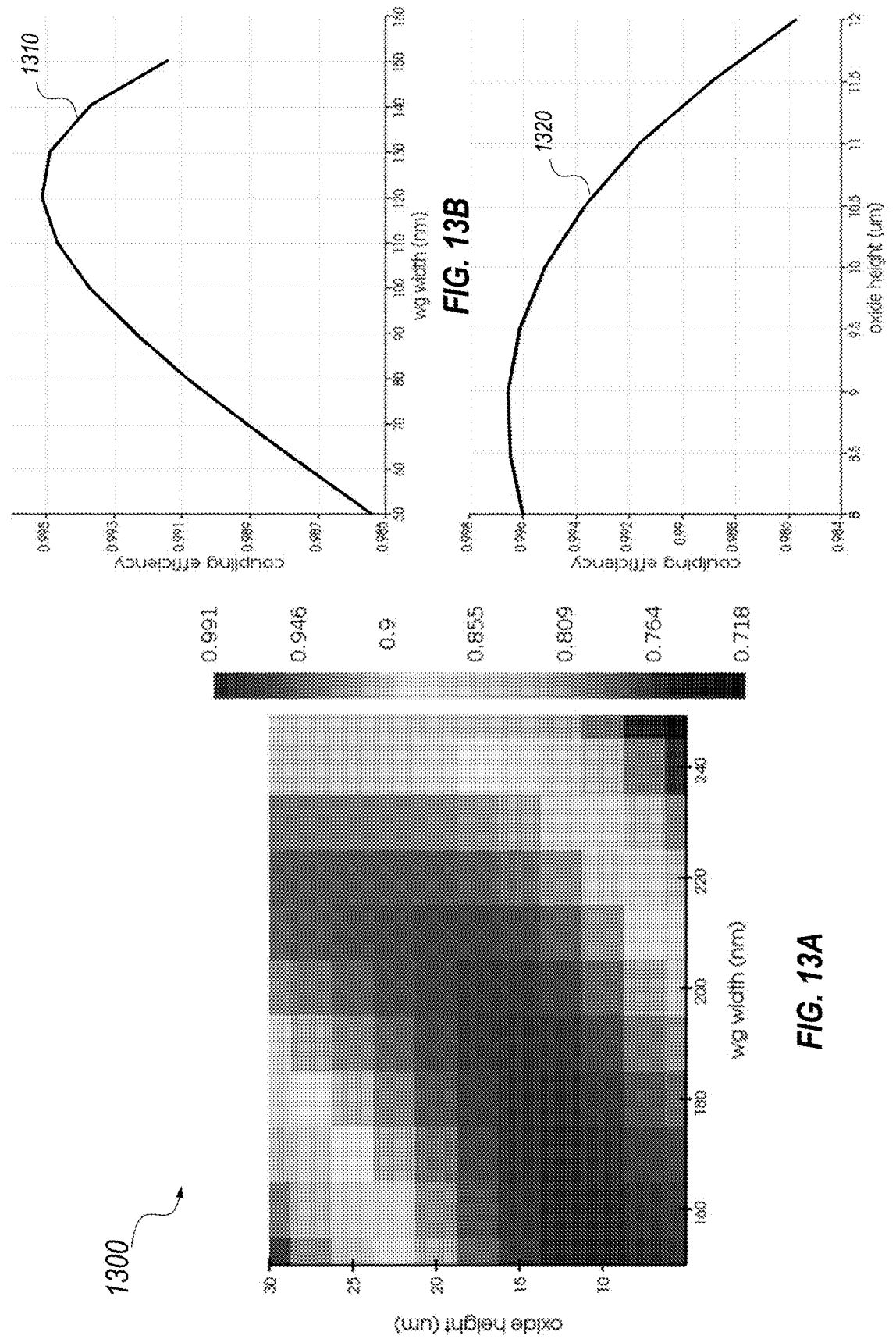

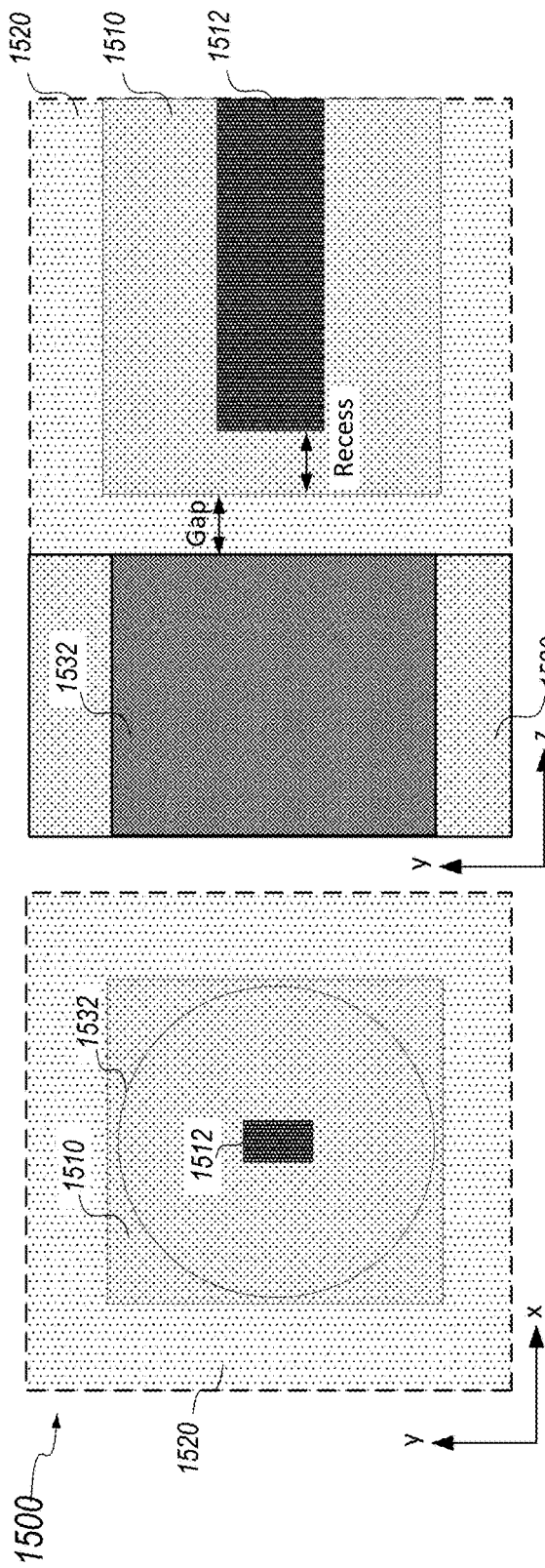
FIG. 15A
FIG. 15B
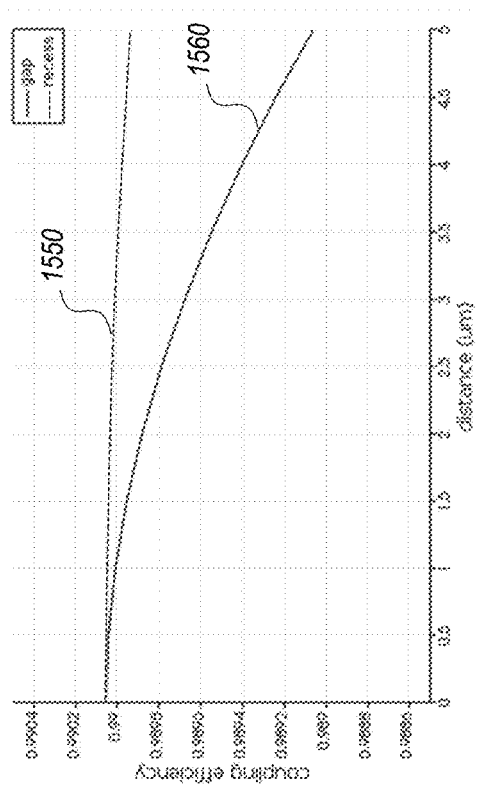
FIG. 15C

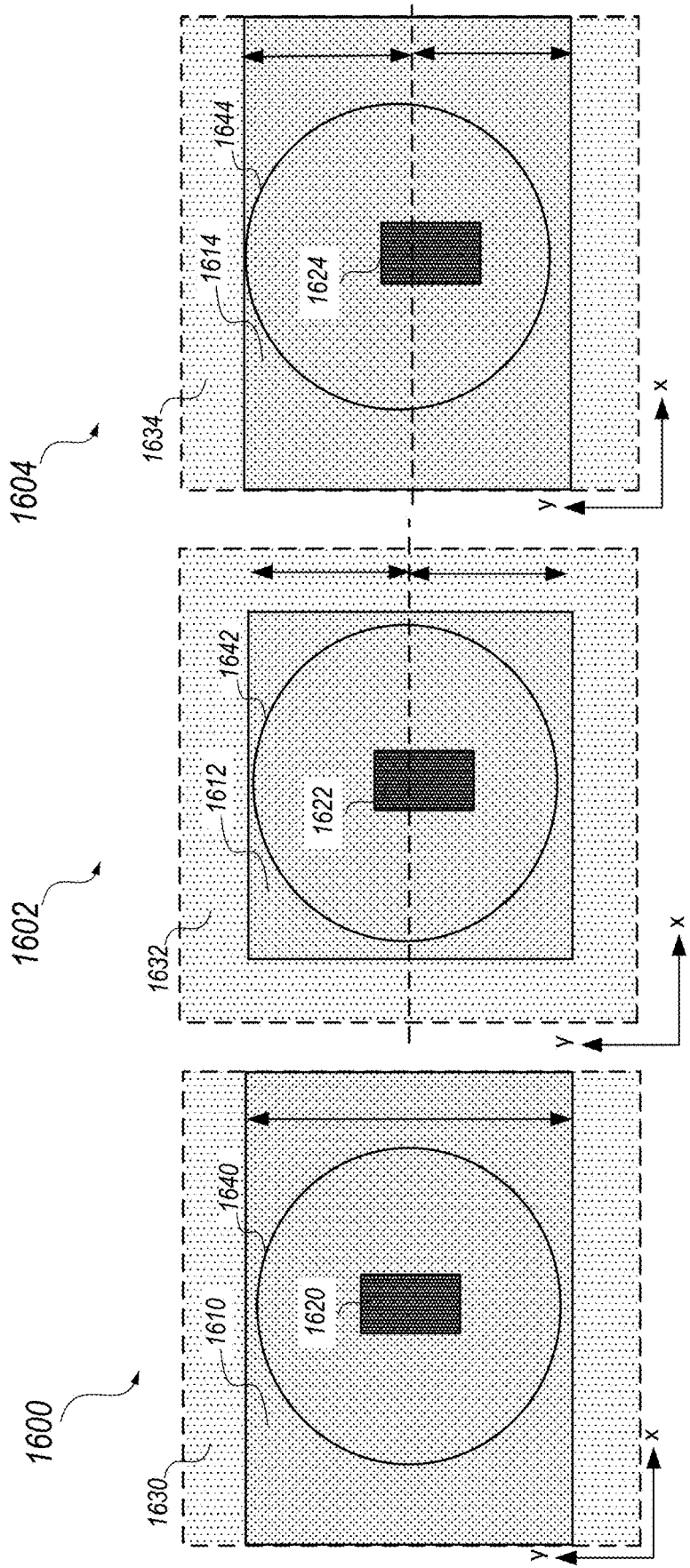

SINGLE PHOTON INTERCONNECT EMPLOYING LOW INDEX CLADDING SPOT SIZE CONVERTER

CROSS-REFERENCE TO RELATED APPLICATION

This application claims the benefit of and priority to U.S. Provisional Application No. 63/202,433, filed Jun. 10, 2021, entitled "SINGLE PHOTON INTERCONNECT EMPLOYING LOW INDEX CLADDING SPOT SIZE CONVERTER," which is herein incorporated by reference in its entirety for all purposes.

BACKGROUND

Photonic integrated circuits, such as silicon photonic integrated circuits, can be used in many systems, such as quantum communication systems and optical quantum computing systems. These quantum mechanics-based systems are distinguished from "classical" systems by their reliance on quantum states, such as quantum bits (qubits). To achieve the desired functions and performance, a quantum mechanics-based system may integrate many passive and active photonic devices, modules, and subsystems into the same system. For example, an optical quantum computer may need to integrate passive and active photonic integrated circuits and other optical and electrical components, such as optical fibers or other low-loss optical interconnects, control circuits, and classical processing units, into a same system, to reliably generate, manipulate (e.g., entangle), and detect hundreds, thousands, or even millions of qubits for computing and error corrections, while achieving the desired functions and performance.

SUMMARY

Techniques disclosed herein relate generally to coupling light between optical fibers and photonic integrated circuits. More specifically, disclosed herein are techniques for improving coupling efficiencies at interfaces between optical fibers and waveguides (or other photonic integrated circuits) to reduce the total loss in a system (e.g., an optical quantum computing system) that may include many fiber links between different chips, wafers, or other modules. Various inventive embodiments are described herein, including methods, processes, systems, devices, circuits, packages, modules, units, wafers, dies, networks, cells, and the like.

According to certain embodiments, a device may include a substrate including an optical fiber alignment structure formed thereon, and may include a spot size converter on the substrate and aligned with the optical fiber alignment structure. The spot size converter has a first end and a second end. The spot size converter may include an oxide layer characterized by a first refractive index, where at least a portion of the oxide layer is tapered such that a first width of the oxide layer at the first end of the spot size converter is smaller than a second width of the oxide layer at the second end of the spot size converter. The spot size converter may also include a waveguide core in the oxide layer, where the waveguide core is tapered and has a first cross-section at the first end of the spot size converter and a second cross-section at the second end of the spot size converter, the first cross-section smaller than the second cross-section. The spot size converter may further include a cladding layer surrounding the oxide layer, the cladding layer having a second refractive index lower than the first refractive index of the oxide layer.

In some embodiments, the difference between the first refractive index and the second refractive index may be between about 0.0015 and about 0.01 or higher. The optical fiber alignment structure may include, for example, a V-groove. The waveguide core may include, for example, silicon nitride ($SiN_x$ or simply SiN), and the oxide layer includes silicon oxide ($SiO_x$, such as $SiO_2$ and/or SiO). The cladding layer may include an epoxy. In some embodiments, the waveguide core may be nonlinearly tapered. In some embodiments, the oxide layer may include a section having a constant width. In some embodiments, the device may also include a heater configured to tune the second refractive index of the cladding layer. In some embodiments, the device may also include an oxide slab at the first end of the spot size converter, the oxide slab connecting the oxide layer at the first end of the spot size converter to an oxide region supported by the substrate. A height of the oxide layer of the spot size converter may be less than 10 μm. In some embodiments, the first cross-section of the waveguide core at the first end of the spot size converter may be less than 0.5×0.5 μm². The spot size converter may be on top of an undercut region of the substrate. In some embodiments, the oxide layer may include a photonic integrated circuit formed therein, the photonic integrated circuit optically coupled to the spot size converter and including a routing waveguide, a beam splitter, an optical resonator, a filter, a delay line, a fusion gate, a polarization splitter, a polarization rotator, an optical switch, a single photon detector, a dispersion compensator, a photodetector, or a combination thereof.

In some embodiments, the device may include an optical fiber positioned on the optical fiber alignment structure and optically coupled to the first end of the spot size converter, where the optical fiber is secured to the optical fiber alignment structure by the cladding layer. The optical fiber may include a single-mode optical fiber or a multi-mode optical fiber. In some embodiments, a center of a fiber core of the optical fiber may be vertically offset from a center of the waveguide core at the first end of the spot size converter. In some embodiments, a diameter of a fiber core of the optical fiber is smaller than the first width of the oxide layer at the first end of the spot size converter. In some embodiments, a coupling efficiency from the optical fiber to the second end of the spot size converter is greater than 95% for both transverse electric mode light and transverse magnetic mode light.

According to certain embodiments, a system may include a first photonic integrated circuit (PIC) die that includes a substrate including an optical fiber alignment structure formed thereon, a single photon generator on the substrate and configured to generate single photons, an optical waveguide on the substrate and configured to transport the single photons, a spot size converter coupled to the optical waveguide and aligned with the optical fiber alignment structure, and an optical fiber including a first fiber end that is positioned on the optical fiber alignment structure and is coupled to the first end of the spot size converter. The spot size converter may have a first end and a second end, and may include an oxide layer characterized by a first refractive index, a waveguide core in the oxide layer, and a cladding layer surrounding the oxide layer. The waveguide core may be tapered and may have a first cross-section at the first end of the spot size converter and a second cross-section at the second end of the spot size converter, where the first cross-section may be smaller than the second cross-section. The cladding layer having a second refractive index lower than the first refractive index of the oxide layer.

In some embodiments of the system, a difference between the first refractive index and the second refractive index is between about 0.0015 and about 0.01 or higher. In some embodiments, at least a portion of the oxide layer of the spot size converter may be tapered such that a first width of the oxide layer at the first end of the spot size converter is smaller than a second width of the oxide layer at the second end of the spot size converter. In some embodiments, the optical waveguide may be configured to transport qubits, qudits, entangled states of qubits, logical qubits, or a combination thereof. The optical fiber alignment structure may include, for example, a V-groove.

In some embodiments, the waveguide core may include silicon nitride, the oxide layer may include silicon oxide, and the cladding layer may include an epoxy. A coupling efficiency between the first fiber end of the optical fiber and the optical waveguide is greater than 95% for both transverse electric mode light and transverse magnetic mode light. In some embodiments, the first PIC die may include a heater configured to tune the second refractive index of the cladding layer of the spot size converter.

In some embodiments, the first PIC die may include an oxide slab at the first end of the spot size converter, the oxide slab connecting the oxide layer at the first end of the spot size converter to an oxide region supported by the substrate. In some embodiments, the first PIC die may include a plurality of oxide ribs connecting the oxide layer of the spot size converter to an oxide region supported by the substrate. In some embodiments, the system may include a second PIC die, where the second PIC die may include a second spot size converter coupled to a second fiber end of the optical fiber. The second PIC die may include a routing waveguide, a beam splitter, a filter, a delay line, a fusion gate, a polarization splitter, a polarization rotator, an optical switch, a single photon detector, a dispersion compensator, a photodetector, or a combination thereof.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIGS. 6A-6C illustrate an example of a structure including a spot size converter according to certain embodiments.

FIGS. 9A-9C illustrate an example of a structure including a spot size converter according to certain embodiments.

FIGS. 10A-10C illustrate another example of a structure including a spot size converter according to certain embodiments.

FIG. 13A illustrates the simulated coupling efficiency of an example of a spot size converter as a function of the width of a tapered core of the spot size converter at the smaller end and the height (and width) of a primary cladding layer of the spot size converter according to certain embodiments.

FIG. 13B illustrates the simulated coupling efficiency of an example of a spot size converter as a function of the width of a tapered core of the spot size converter at the smaller end according to certain embodiments.

FIG. 13C illustrates the simulated coupling efficiency of an example of a spot size converter as a function of the height (and width) of a primary cladding layer of the spot size converter according to certain embodiments.

FIGS. 15A and 15B illustrate an example of a spot size converter including a lower-index secondary cladding layer according to certain embodiments.

FIG. 15C illustrates the simulated coupling efficiency of an example of a spot size converter as a function of a gap between an optical fiber and the spot size converter or the recess of a tapered core of the spot size converter from the tip of spot size converter according to certain embodiments.

FIGS. 16A-16C illustrate examples of spot size converters according to certain embodiments.

DETAILED DESCRIPTION

Figure 1A:
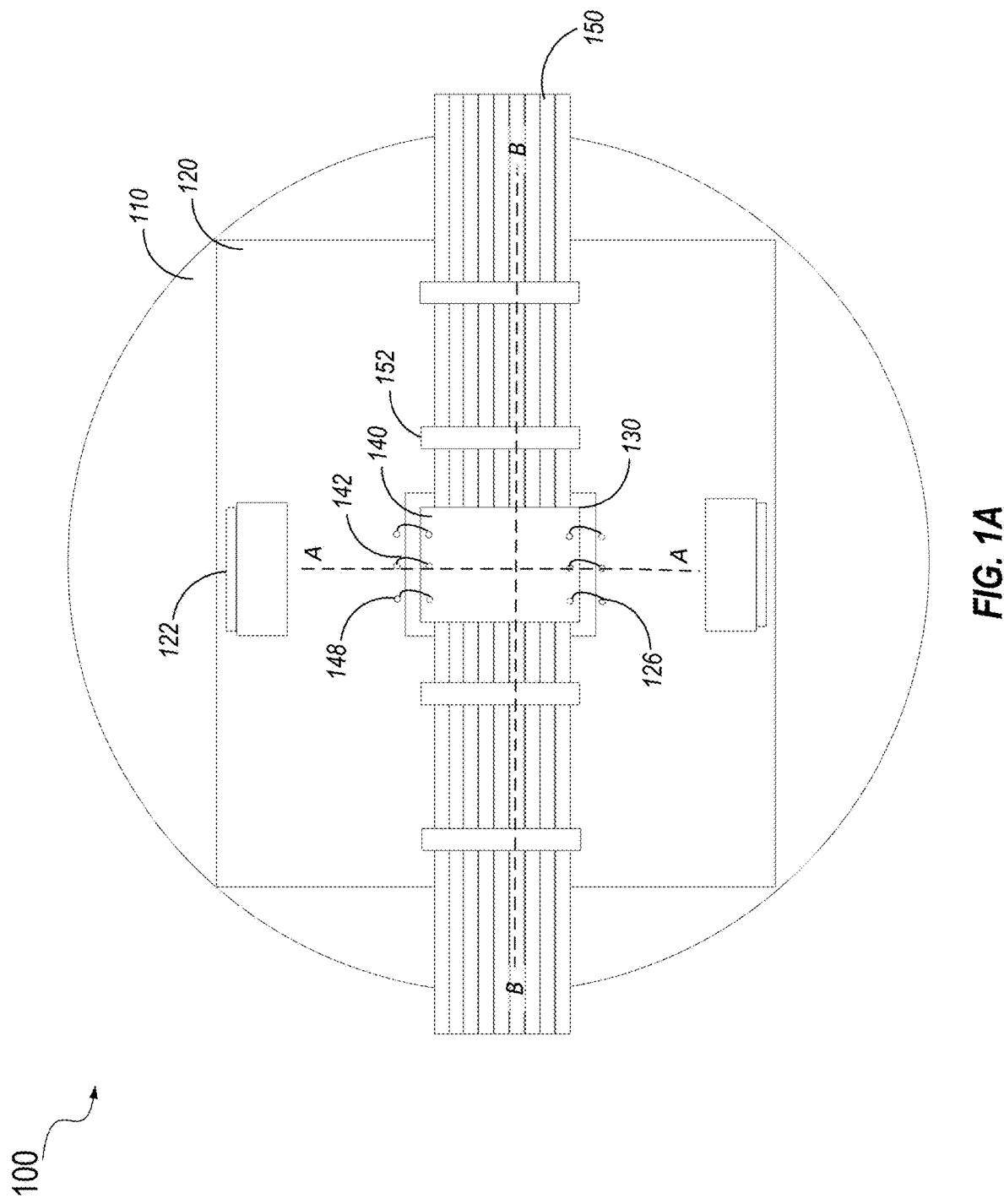
FIG. 1A is a top view of an example of an optical module including a photonic integrated circuit die coupled to optical fibers according to certain embodiments.

Techniques disclosed herein relate generally to coupling light between optical fibers and photonic integrated circuits. More specifically, disclosed herein are techniques for reducing coupling losses at interfaces between optical fibers and components in the photonic integrated circuits (e.g., waveguides) to, for example, about 30 mdB/facet or lower, in order to reduce the total loss in a system (e.g., an optical quantum computing system) that may include many fiber links between modules. Various inventive embodiments are described herein, including methods, processes, systems, devices, circuits, packages, modules, units, wafers, dies, networks, cells, and the like.

Many optical systems may integrate passive and active photonic integrated circuits and other optical and electrical components, such as optical fibers or other low-loss optical interconnects. These circuits and components may have different dimensions and other properties (e.g., refractive indices). Therefore, light may propagate in these circuits and components in optical modes having different mode sizes. Optical couplers, such as spot size converters or other mode converters, may be used to connect these circuits and components. In a system that may include many of these optical couplers on a same signal path, the total loss caused by these couplers may be high. Thus, these optical couplers may not be suitable for transporting optical signals in, for example, optical quantum computing systems where single photons or entangled photons are generated, manipulated, transported, and detected.

According to certain embodiments, to match the mode sizes of an optical fiber (e.g., a single mode fiber) and a waveguide thereby reducing the coupling loss at the interface between the optical fiber and the waveguide, a coupler including a spot size converter (SSC) that includes a cantilever having a tapered waveguide core (e.g., silicon nitride ($SiN_x$ or simply SiN) or silicon (Si)). surrounded by a primary cladding material (e.g., oxide) layer and a secondary cladding material (e.g., an epoxy or a low K dielectric) having a slightly lower refractive index than the primary cladding material may be used to gradually change the mode size of the optical mode to match the mode sizes of the optical fiber and the waveguide. The tapered waveguide core of the cantilever may be tapered linearly or nonlinearly. In some embodiments, the refractive index contrast between the primary cladding material and the secondary cladding material may be within a certain range (e.g., between about 0.0015 and about 0.01 or higher).

In some embodiments, the SSC may have an inversely tapered (or straight and then inversely tapered) primary cladding layer for the waveguide. In some embodiments, the SSC may include a thermal controller (e.g., a heater) configured to adjust the local temperature and thus the index contrast between the primary cladding material and the secondary cladding material at a room temperature or at cryogenic temperatures. In some embodiments, additional oxide structures may be used to connect the tip of the cantilever to other oxide regions to provide better mechanical support and reliability. In some embodiments, the waveguide (e.g., SiN waveguide) can be vertically off-centered in an oxide (e.g., $SiO_2$) slab or a square-shaped waveguide. Parameters such as dimensions of the tapered waveguide, dimensions of the primary cladding, and the index contrast can be selected to achieve better performance.

Techniques disclosed herein can drastically reduce the coupling loss, for example, to less than about 30 mdB/facet or lower (e.g., about 7 mdB/facet). The SSC disclosed herein can also achieve polarization independent coupling, can be used at cryogenic temperatures, and can be mechanically robust, and thus can be used in optical quantum computing systems, optical quantum communication systems, or other systems that need very low-loss coupling between fibers and waveguides. The SSC disclosed herein may be used to couple photons from an optical fiber to a waveguide, from a waveguide to an optical fiber, from one waveguide to another waveguide, and the like, by matching the optical mode fields of the optical components to be connected.

As used herein, a "qubit" (or quantum bit) refers to a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of atoms, ions, nuclei, or photons. Other examples may include other engineered quantum systems such as flux qubits, phase qubits, or charge qubits (e.g., formed from a superconducting Josephson junction); topological qubits (e.g., *Majorana* fermions); or spin qubits formed from vacancy centers (e.g., nitrogen vacancies in diamond). A physical qubit may be a physical device that behaves as a two-state quantum system. In one example, a qubit can be "dual-rail encoded" such that the logical value of the qubit is encoded by the occupation of one of two modes of the quantum system.

As used herein, a "resource state" refers to an entangled state of a number of qubits in a non-separable entangled state (which is an entangled state that cannot be decomposed into smaller separate entangled states). In various embodiments, the number of qubits of a resource state can be a small number (e.g., two or more, or any number up to about 20) or a larger number (as large as desired).

As used herein, a "logical qubit" refers to a physical or abstract qubit that has a long enough coherence time to be usable by quantum logic gates. A logical qubit may specify how a single qubit should behave in a quantum algorithm, subject to quantum logic operations by quantum logic gates. Due to issues such as stability, decoherence, fault tolerance, and scalability associated with a physical qubit that includes a single two-state quantum system, physical qubits may not be used to reliably encode and retain information for a sufficiently long period of time to be useful. Therefore, quantum error correction may need to be used to produce scalable quantum computers, where many physical qubits may be used to create a single, error-tolerant logical qubit. Depending on the error-correction scheme used and the error rates of each physical qubit, a single logical qubit may be formed using a large number (e.g., tens, hundreds, thousands, or more) of physical qubits. As used in the following sections, the term "qubit" generally refers to a physical qubit, whereas all references to logical qubits include the qualifier "logical."

As used herein, a "quantum system" may include particles (such as atoms, ions, nuclei, and/or photons) or engineered quantum systems, such as flux qubits, phase qubits, or charge qubits (e.g., formed from a superconducting Josephson junction), topological qubits (e.g., *Majorana fermions*), spin qubits formed from vacancy centers (e.g., nitrogen vacancies in diamond), qubits otherwise encoded in multiple quantum systems (e.g., Gottesman-Kitaev-Preskill (GKP) encoded qubits), entangled states of qubits, and the like.

As used herein, "fusion" (or "a fusion operation" or "fusing") refers to a two-qubit entangling measurement. A "fusion gate" is a structure that receives two input qubits, each of which is typically part of an entangled state of qubits. The fusion gate may perform a projective measurement operation on the input qubits to produce either one (e.g., in "type I fusion") or zero (e.g., in "type II fusion") output qubit in a manner such that the initial two entangled states of qubits are fused into a single entangled state of qubits. Fusion gates are specific examples of a general class of two-qubit entangling measurements and are particularly suited for photonic architectures.

Several illustrative embodiments will now be described with respect to the accompanying drawings. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

An optical system, such as an optical quantum computing system or an optical quantum communication system, may integrate passive and active photonic integrated circuits and other optical and electrical components, such as optical fibers or other low-loss optical interconnects, control circuits, and processing units, into a same system to reliably generate, manipulate (e.g., entangle), and detect hundreds, thousands, or even millions of qubits for computing and error corrections.

FIG. 1A is a top view of an example of an optical module 100 including a photonic integrated circuit (PIC) die 130 coupled to optical fibers 150 according to certain embodiments. In the illustrated example, optical module 100 includes PIC die 130, an electrical integrated circuit (EIC) die 140, a printed circuit board (PCB) 120, one or more electrical connectors 122, and optical fibers 150 on a silicon handle wafer 110. Even though FIG. 1A only shows one PIC/EIC (EPIC) die stack, multiple EPIC die stacks may be included in optical module 100. PCB 120 may be attached to silicon handle wafer 110, e.g., using an epoxy or through fusion bonding or hybrid bonding, depending on the material of PCB 120. In some embodiments, one or more PCBs 120 may be attached to silicon handle wafer 110 at different horizontal and/or vertical locations. An EPIC die stack includes EIC die 140 bonded face-to-face with PIC die 130 (e.g., by fusion bonding or hybrid bonding) such that the PICs may directly face the EICs and the substrates of PIC die 130 and EIC die 140 are on opposite sides of the EPIC die stack. The EPIC die stack may be bonded to silicon handle wafer 110 by, for example, fusion bonding. EIC die 140 may be electrically connected to PCB 120 through bonding wires 142, where the bonding pads and bonding wires may only be at the top (north) and bottom (south) sides of the EPIC die stack. The left (west) and right (east) sides of the EPIC die stack may be coupled with optical fibers 150, where optical fibers 150 may be attached to PCB 120 through harnesses 152. PCB 120 may also include electrical connectors 122 and some other electronic components, such as voltage regulators, power management ICs, decoupling capacitors, etc.

Figure 1B:
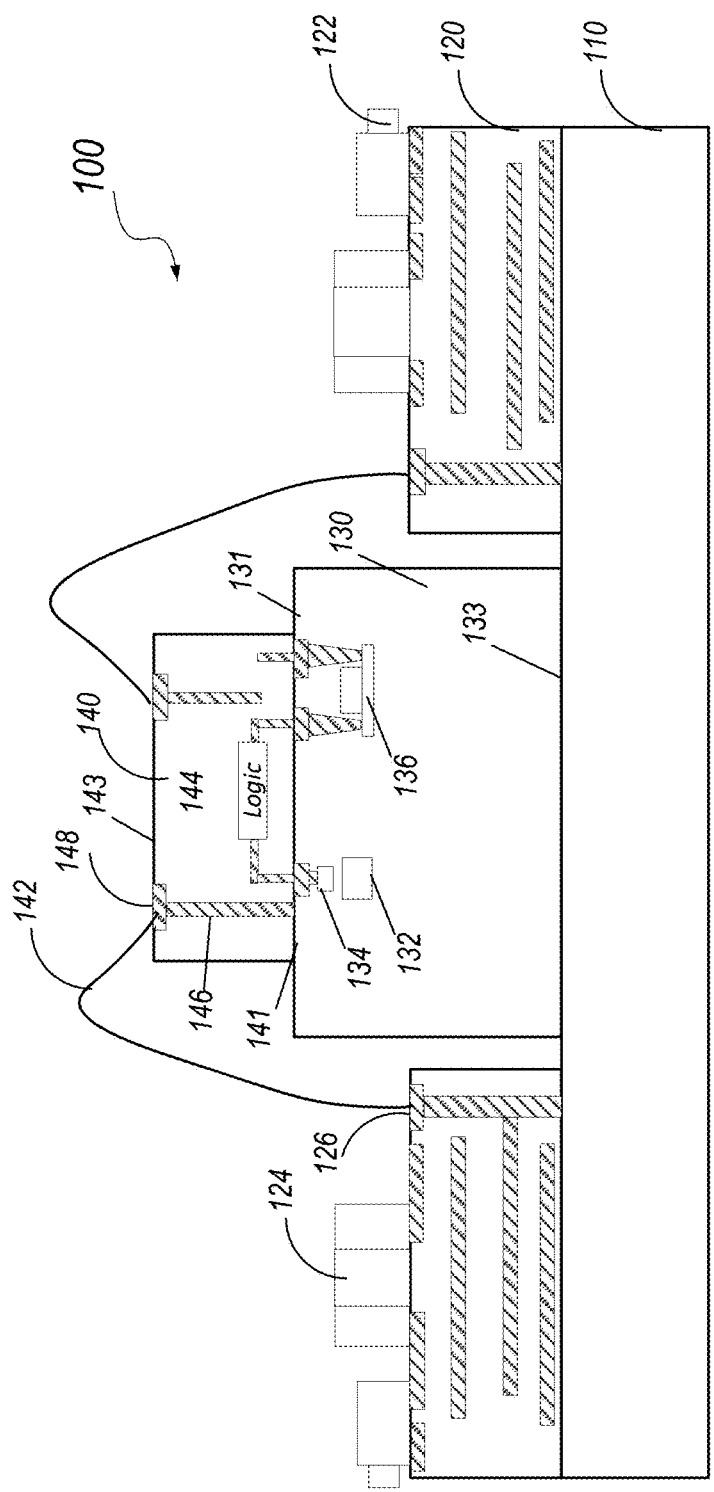
FIG. 1B is a cross-sectional view of the example package shown in FIG. 1A according to certain embodiments.

FIG. 1B is a cross-sectional view of optical module 100 along a line A-A shown in FIG. 1A according to certain embodiments. In the example shown in FIG. 1B, PCB 120 and the PIC/EIC die stack are bonded to a top surface of silicon handle wafer 110. PCB 120 may include multiple layers of interconnect traces or planes connected through vias. Electronic components, such as electrical connector 122 and decoupling capacitors 124 may be soldered on the top surface of PCB 120. PCB 120 may also include solder pads 126 on the top surface of PCB 120. The PIC/EIC die stack may include PIC die 130 and EIC die 140. PIC die 130 may include a back surface 133 bonded to silicon handle wafer 110. PIC die 130 may also include a front surface 131 that may include circuits or pads. EIC die 140 may include a back surface 143 that may include a redistribution layers and bonding pads 148. EIC die 140 may also include a front surface 141 that may include circuits or pads. EIC die 140 and PIC die 130 may be bonded face-to-face with each other such that front surface 131 of PIC die 130 and front surface 141 of EIC die 140 may directly face each other and the interconnections can be short. PIC die 130 may include waveguides 132 and 136, and other photonic integrated circuits, such as single photon generators, switches, waveguide couplers, and photodetectors 134. EIC die 140 may include some through-silicon vias (TSVs) 146 and control logic circuits 144. For example, a photodetector 134 may detect a single photon from waveguide 132, and send the detection result to control logic circuit 144, which may determine whether and how to tune waveguide 136 (e.g., to turn on or off an optical switch). Bonding pads 148 may be connected to control logic circuits 144 through TSVs, and may also be connected to solder pads 126 on PCB 120 through bonding wires 142.

Figure 1C:
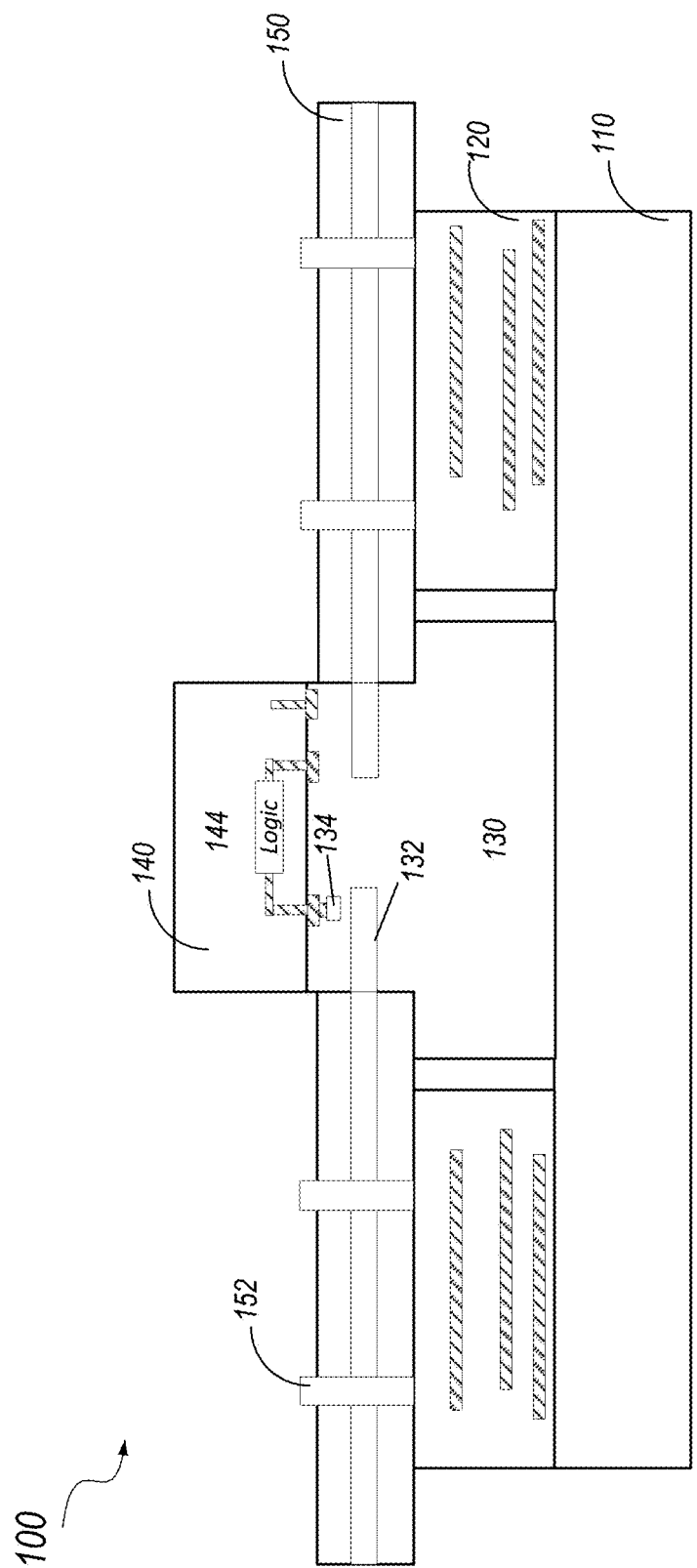
FIG. 1C is another across-sectional view of the example package shown in FIG. 1 according to certain embodiments.

FIG. 1C is another cross-sectional view of optical module 100 along a line B-B shown in FIG. 1A according to certain embodiments. In the example shown in FIG. 1C, in the B-B direction, optical fibers 150 may be attached to PCB 120 through harnesses 152. Optical fibers 150 may fit in V-grooves formed on PIC die 130, where the V-grooves may align with the waveguides on PIC die 130. Therefore, when assembled, the cores of optical fibers may align with corresponding cores of the waveguides on PIC die 130. Optical fibers 150 may be used to send photons into optical module 100, couple photons out of optical module 100, or loop photons from optical module 100 back into optical module 100. The photons may include pump photons, data communication signals (e.g., control signals), quantum states, and the like.

Figure 2:
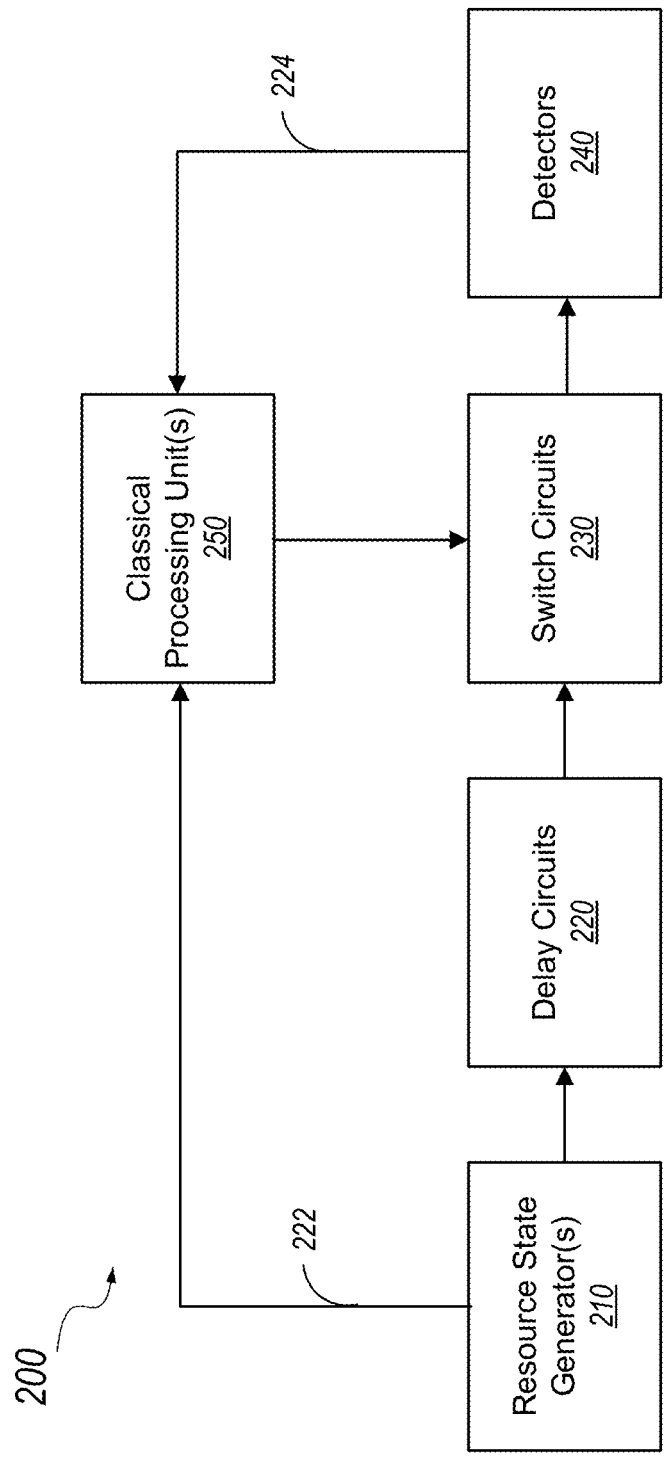
FIG. 2 is a simplified block diagram of an example of a quantum computing system according to some embodiments.

FIG. 2 is a simplified block diagram of an example of a quantum computing system 200 according to some embodiments. Quantum computing system 200 may include one or more optical modules 100 described above. Quantum computing system 200 may implement, for example, measurement-based quantum computing (MBQC) or fusion-based quantum computing (FBQC). Some embodiments of quantum computing system 200 may use photonic physical qubits to generate a fault-tolerant cluster state that can be used to represent logical qubits for MBQC, while other embodiments of quantum computing system 200 may generate measurement data reflecting entanglement structures for fault-tolerant FBQC. In the illustrated example, quantum computing system 200 may include resource state generator(s) 210, delay circuits 220, switch circuits 230, detectors 240, and one or more classical processing units 250.

Resource state generators 210 may include one or more resource state generators (RSGs). The RSGs may autonomously operate, with no data input needed. Each RSG may generate one resource state per clock cycle (which can be, e.g., shorter than about 1ns, about 1 ns, or longer than about 1 ns). Each resource state may include multiple (e.g., 7 or 9) entangled physical qubits. The resource state can be output to delay circuits 220 at a rate of, for example, about n×N photons per clock cycle, where n is the number of qubits in each resource state and N is the number of RSGs. Resource state generators 210 can also send classical data output (e.g., indicating success or failure of various elements of the resource state generation process) to classical processing unit 250 via a data path 222. In some embodiments, resource state generators 210 can be maintained at cryogenic temperatures (e.g., 4 K). Delay circuit 220 can include optical fibers, other waveguides, optical memory, or other components to delay or store photons corresponding to particular qubits by appropriate delay times, such as 1 clock cycle, L clock cycles, and $L^2$ clock cycles, where L may be any integer number. Delay circuits 220 may not need to operate at cryogenic temperatures. Photons exiting delay circuits 220 can be delivered to switch circuits 230 via, for example, optical fibers, on-chip waveguides, or any other type of waveguides or optical interconnects.

Switch circuits 230 may include active switches and waveguides to perform mode coupling, mode swapping, phase shift, and other operations on the qubits. In various embodiments, switch circuits 230 may perform mode coupling operations associated with fusion operations as described below and/or basis selection operations associated with measurement of individual qubits. In some embodiments, switch circuits 230 may be dynamically reconfigurable in response to control signals from classical processing units 250, and thus quantum computing system 200 may perform different computations by reconfiguring switches in switch circuits 230. Switch circuits 230 may deliver output photons to detectors 240 via, for example, optical fibers, on-chip waveguides, or any other type of optical interconnects.

Detectors 240 may include photon detectors capable of detecting single or multiple photons. Each photon detector may be coupled to one waveguide and may generate an output (classical) signal indicating whether a photon was detected. In some embodiments, some or all detectors 240 may be capable of counting photons, and the output signal from each detector 240 may indicate the number of photons detected by the detector 240. In some embodiments, detectors 240 may operate at cryogenic temperatures. Detectors 240 may provide classical output signals indicating the number of photons, or binary signals indicating whether a photon was detected, to classical processing unit 250 via a signal path 224, such as optical fibers.

Classical processing unit 250 may be a classical computer system that is capable of communicating with resource state generator(s) 210, switch circuits 230, and detectors 240 using classical digital logic signals. In some embodiments, classical processing unit 250 may determine appropriate settings for switch circuits 230 based on a particular quantum computation (or program) to be executed. Classical processing unit 250 may receive feedback signals (e.g., measurement outcomes) from resource state generators 210 and detectors 240 and can determine the result of the computation based on the feedback signals. In some embodiments, classical processing unit 250 can use feedback signals to modify subsequent control signals sent to switch circuits 230. Operation of classical processing unit 250 may incorporate error correction algorithms and other techniques.

Quantum computing system 200 of FIG. 2 is illustrative, and variations and modifications are possible. Blocks shown separately can be combined, or a single block can be implemented using multiple distinct components. Resource state generator(s) 210, delay circuits 220, switch circuits 230, and detectors 240 can implement the circuits descried above and below for generating entanglement structures. For instance, delay circuits 220 may implement delay lines for resource state fusion, while switch circuits 230 may implement reconfigurable switches and mode couplers associated with reconfigurable fusion, and detectors 240 may implement destructive measurements associated with fusion operations. Quantum computing system 200 is just one example of a quantum computing system or another photonic system that can use the wafer-scale modules described herein. Those skilled in the art will appreciate that many different systems can be implemented using the wafer-scale modules that each include PIC or EPIC dies bonded to and optically coupled to an optical backplane having low-loss waveguides.

A qubit used in a quantum system may be physically realized using a pair of waveguides into which a single photon is introduced. Qubits can be operated upon using mode couplers (e.g., beam splitters), variable phase shifters, photon detectors, and the like. For instance, entanglement between two (or more) qubits can be created by providing mode couplers between waveguides associated with different qubits. As also described above, physical qubits may suffer from loss and/or noise. Consequently, relying on single physical qubits (e.g., a photon propagating in a pair of waveguides) when performing a quantum computation may result in an unacceptably high error rate. To provide fault tolerance, photonic quantum computers can be designed to operate on one or more logical qubits, where a logical qubit is a multi-qubit quantum system in an entangled state that enables error correction (also referred to herein as an error correcting code). For example, in some embodiments, the structure of the error correcting code can be represented as a graph in three dimensions. In the context of quantum computing, logical qubits can improve robustness by supporting error detection and error correction. Logical qubits may also be used in other contexts, such as quantum communication.

Figure 3:
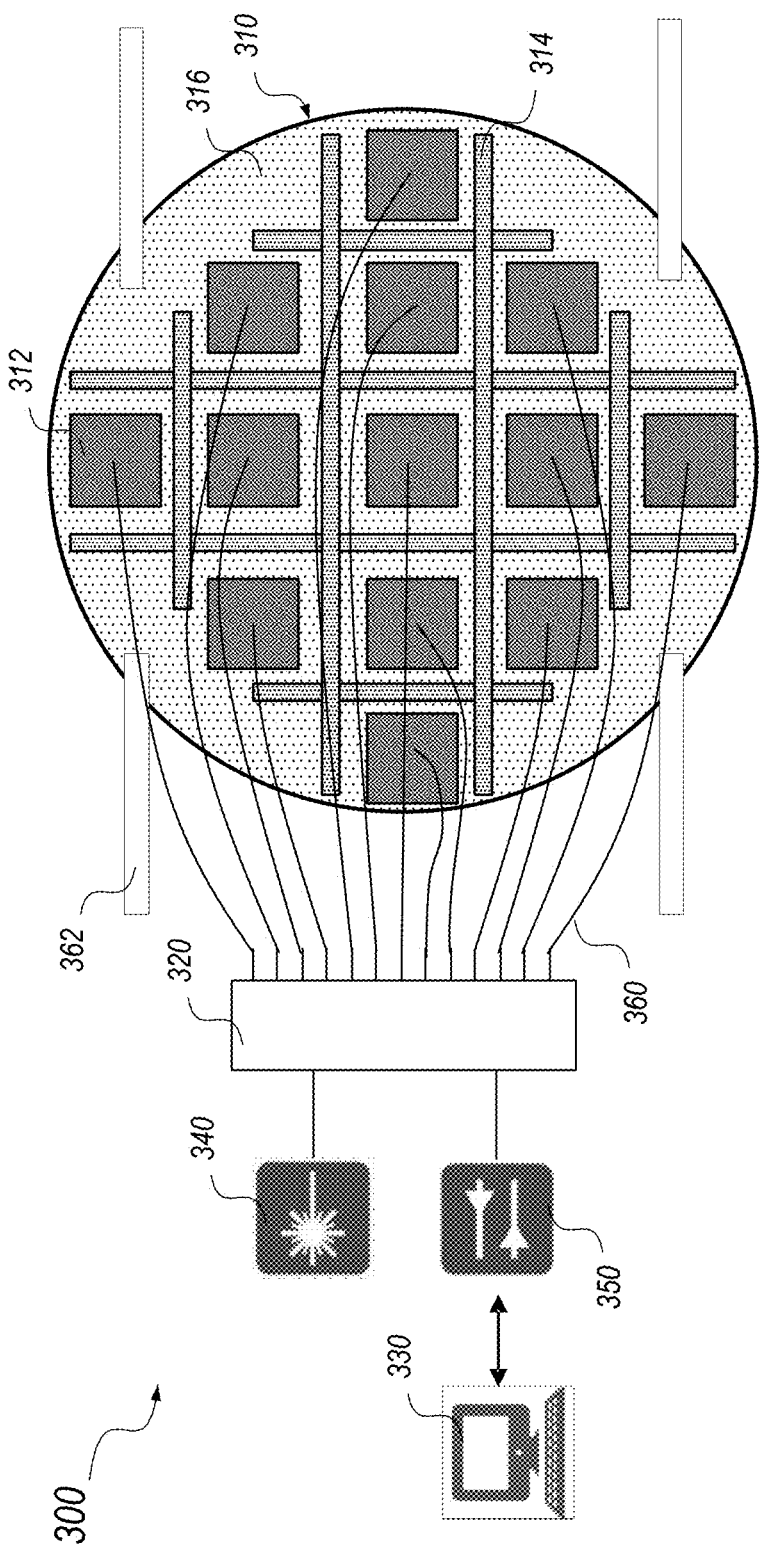
FIG. 3 illustrates an example of a subsystem for generating entangled quantum states (e.g., resource states or logical qubits) according to certain embodiments.

FIG. 3 illustrates an example of a subsystem 300 for generating entangled quantum states (e.g., resource states or logical qubits) according to certain embodiments. Subsystem 300 may include a wafer-scale module 310 that includes multiple EPIC die stacks 312 bonded to an optical backplane 316. Wafer-scale module 310 may be an example of optical module 100 or resource state generator 210. EPIC die stacks 312 may be manufactured and bonded to optical backplane 316 as described in details above and below. Wafer-scale module 310 may also include a plurality of PCBs 314 (e.g., an electrical backplane). The EIC dies in EPIC die stacks 312 may be electrically connected to PCBs 314 using, for example, wire bonding. EPIC die stacks 312 may be used to, for example, generate, manipulate, transport, and detect qubits or entangled states of qubits for optical quantum computing or optical quantum communication. For example, EPIC die stacks 312 may include single photon generators, mode couplers, fusion gates, beam splitters, switches, single photon detectors or multi-photon detectors, waveguides, delay lines, modulators, optical switches, ring oscillators, couplers, photodiode-based photodetectors for receiving data and timing signals, and the like, as described above and below. EPIC die stacks 312 may be optically connected together through optical fibers, optical waveguides in optical backplane 316, free-space optical interconnects, and/or other optical interconnects.

Wafer-scale module 310 may be connected to a distribution network 320 through optical fibers 360. Optical fibers 360 may be coupled to EPIC die stacks 312 through grating couplers (or edge couplers) and/or optical backplane 316. Distribution network 320 may be connected to one or more pump laser sources 340 and a control unit 330 (e.g., through an optical transceiver 350). Control unit 330 may include, for example, a classical computing system. In some embodiments, control unit 330 and/or distribution network 320 may be used to control two or more wafer-scale modules 310. Optical fibers 360 may be used to, for example, send pump laser pulses from pump laser sources 340 to EPIC die stacks 312 for single photon generation, send control data from control unit 330 and optical transceiver 350 to EPIC die stacks 312 (e.g., to control the switches), send measurement data from EPIC die stacks 312 to optical transceiver 350 and control unit 330, and the like.

In one example, each EPIC die stack 312 may include a single photon generator that includes waveguides, ring oscillators, interferometers, couplers, optical switches, WDM filters, single photon detectors, and the like that form multiple multiplexed photon pair sources to deterministically generate single photons through a nonlinear optical process (e.g., spontaneous four-wave mixing (SFWM), spontaneous parametric down-conversion (SPDC), second harmonic generation, etc.). In one embodiment, each photon pair source may include a micro-ring-based SFWM heralded photon source (HPS), where the detection of one photon of a pair of photons generated during the nonlinear process by a single photon detector (e.g., a superconductive nanowire single photon detector (SNSPD)) may herald the existence of the other photon in the pair that may be used to implement a qubit or generate an entangled resource state. Other classes of photon sources that do not use a nonlinear material may also be employed, such as those that employ atomic and/or artificial atomic systems (e.g., quantum dot sources, color centers in crystals, etc.). The operations of some photon sources may be non-deterministic (also sometimes referred to as "stochastic") such that a given pump pulse may or may not produce a pair of photons. In such photon sources, coherent spatial and/or temporal multiplexing of several non-deterministic photon sources may be performed to increase the probability of having one photon in any given cycle. When the number of multiplexed non-deterministic photon sources is large, the probability of having one photon in any given cycle may be about 100%.

As illustrated in FIG. 3, wafer-scale module 310 may also be coupled to one or more optical fibers 362. The one or more optical fibers 362 may be used to transmit single photons, qubits, or entangled states of qubits between different wafer-scale modules 310 or may be used to loop qubits back to the same wafer-scale module after a delay. As described above and below, in some embodiments, optical fibers 362 may be coupled to waveguides in optical backplane 316 through low-loss couplers. In some embodiments, optical fibers 362 may be used as a long delay line for delaying the qubits to perform time-like resource state fusion operations. In some embodiments, optical fibers 362 may also be used for data communication or for transmitting pump laser pulses.

As described above, a plurality of EPIC die stacks may be bonded to a handle wafer, for example, by fusion bonding or oxide bonding, to form a wafer-scale module. The plurality of EPIC die stacks may be used to, for example, generate, manipulate, and detect qubits for optical quantum computing. In some embodiments, multiple wafer-scale modules may be connected through fiber cables, free-space optical interconnects, or other optical interconnects to form a subsystem or a system for larger scale quantum state generation, manipulation, and detection.

Figures 4A, 4B:
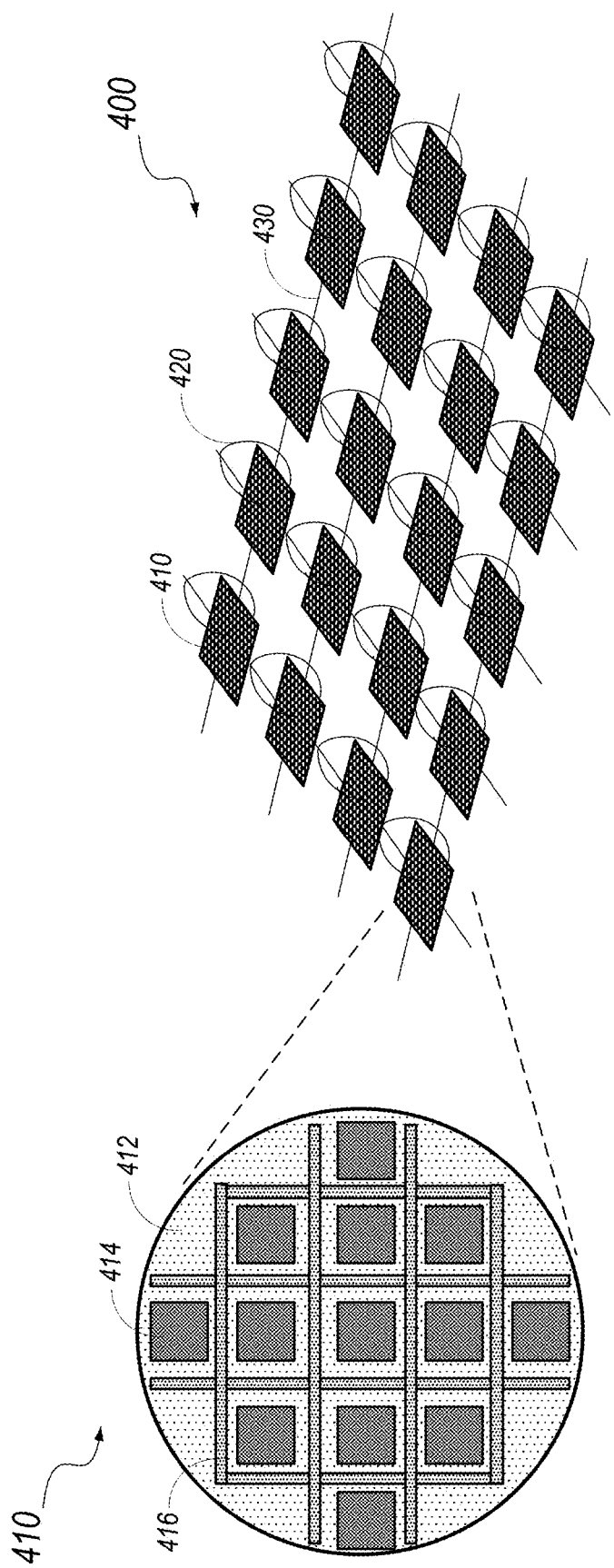
FIG. 4A is a top view of an example of a wafer-scale module including multiple EPIC die stacks on a handle wafer according to certain embodiments.
FIG. 4B illustrates an example of a system including multiple wafer-scale modules interconnected using optical fibers according to certain embodiments.

FIG. 4A is a top view of an example of a wafer-scale module 410 including multiple EPIC die stacks 414 on a handle wafer 412 according to certain embodiments. Wafer-scale module 410 may be an example of optical module 100, resource state generator 210, or subsystem 300. EPIC die stacks 414 may each include a PIC die and an EIC die, and may be manufactured and bonded to handle wafer 412 (e.g., including an optical backplane or another optical interposer) as described above. An EPIC die stack 414 may be optically connected to another EPIC die stack 414 through one or more optical fibers, one or more optical waveguides in the optical interposer, one or more free-space optical interconnects, or other optical interconnects. Wafer-scale module 410 may also include a plurality of PCBs 416. The EIC dies in EPIC die stacks 414 may be electrically connected to PCBs 416 using, for example, wire bonding. EPIC die stacks 414 may be used to, for example, generate, manipulate, and/or detect qubits (e.g., photonic qubits that employ one or more photons) or entangled states of qubits for optical quantum computing.

FIG. 4B illustrates an example of a system 400 including multiple wafer-scale modules 410 interconnected using optical fibers according to certain embodiments. As described above with respect to FIG. 4A, each wafer-scale module 410 may include multiple EPIC die stacks. Optical fibers may be used to provide inter-wafer and/or intra-wafer optical interconnects. For example, optical fibers 420 may be used to connect EPIC die stacks 414 on a same wafer-scale module 410, while optical fibers 430 may be used as interconnects between wafer-scale modules 410. System 400 may be used to perform, for example, qubit generation, manipulation, and/or detection at a larger scale.

Figure 5:
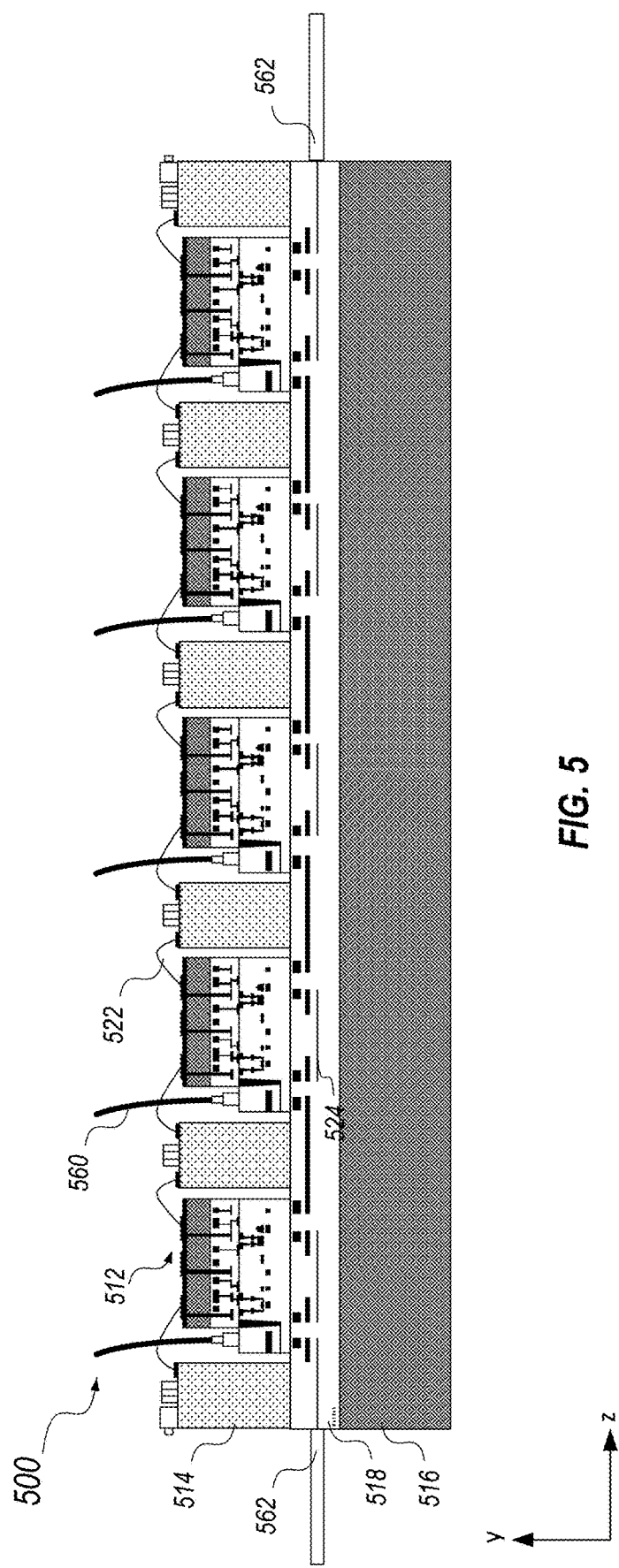
FIG. 5 is a cross-sectional view of an example of a wafer-scale module according to certain embodiments.

FIG. 5 is a cross-sectional view of an example of a wafer-scale module 500 (e.g., subsystem 300 or wafer-scale module 410) according to certain embodiments. As shown in FIG. 5, wafer-scale module 500 may include multiple EPIC die stacks 512, multiple PCBs 514, and optical fiber bundles. EPIC die stacks 512 may be optically connected to each other or other wafer-scale modules through an optical backplane 516, and may be electrically connected to PCBs 514 through bonding wires 522. Optical backplane 516 may include a dielectric layer 518 that includes one or more waveguide layers formed therein. The one or more waveguide layers may include low-loss waveguides 524 for transmitting, delaying, or storing single photons, qubits, qudits, resource states, or other entangled states. For example, waveguides 524 may include pairs of waveguides used to implement or transmit qubits and/or entangled qubits (e.g., resource states or larger entangled states of qubits). Photons may be coupled from one waveguide to another waveguide or from one waveguide layer to another waveguide layer through, for example, waveguide couplers. Photons may also be coupled from waveguides 524 in optical backplane 516 to waveguides in EPIC die stacks 512 through other waveguide layers and waveguide couplers in optical backplane 516 and/or EPIC die stacks 512. The waveguide couplers can be any type of waveguide coupler, e.g., adiabatic and/or evanescent waveguide couplers.

In the illustrated example, each EPIC die stack 512 may include a grating coupler for receiving pump light and/or data communication signals from an optical fiber 560. Optical fibers 562 may be coupled to waveguides 524 in optical backplane 516 through optical input/output ports that may include, for example, V-groove alignment structures and low-loss couplers, such as a tapered structure, a sub-wavelength grating, an edge coupler, and the like. Optical fibers 562 may be connected to other wafer-scale modules 500 or may be connected to different portions of wafer-scale module 500 (e.g., loop photons or qubits from wafer-scale module 500 back to wafer-scale module 500 after a delay).

FIGS. 6A-6C illustrate an example of a structure 600 including a spot size converter 622 (also referred to as herein an optical mode transformer, a fiber-to-waveguide coupler, or a coupler) according to certain embodiments. Spot size converter 622 can be used to, for example, couple light between EPIC die stacks 312 of FIG. 3, couple light between wafer-scale modules 410 of FIG. 4, couple light between two ports of a wafer-scale module 410 of FIG. 4, or couple light from optical fibers 562 to waveguides 524 or from waveguides 524 to optical fibers 562 in wafer-scale module 500 of FIG. 5. FIG. 6A shows an x-y cross-section of structure 600. FIG. 6B shows a y-z cross-section of structure 600. FIG. 6C shows an x-z cross-section of structure 600. In the illustrated example, structure 600 includes a substrate 610 (e.g., a silicon substrate) that may include a V-groove 612 formed therein. Oxide layers 620, waveguides (e.g., a waveguide 628), and other photonic integrated circuits may be formed on substrate 610 using semiconductor processing techniques. Oxide layers 620 may include one or more oxide layers (e.g., $SiO_2$) deposited on substrate 610. The waveguides may include a waveguide core (e.g., SiN or Si) and waveguide cladding layers (e.g., one or more oxide layers 620). An optical fiber 630 may be coupled to waveguide 628 through spot size converter 622. Optical fiber 630 may include a fiber core 632 and a fiber cladding layer 634, where fiber core 632 and fiber cladding layer 634 may both have a circular-shaped cross-section. Fiber core 632 may have a refractive index higher than the refractive index of fiber cladding layer 634, such that light may propagate within fiber core 632 through total internal reflection. Optical fiber 630 may be positioned in V-groove 612.

Spot size converter 622 may include a core 624 and a cladding layer 626. Core 624 may include a high index material (e.g., SiN or Si). Cladding layer 626 may include a low-index material, such as silicon oxide ($SiO_x$, such as $SiO_2$ and/or SiO). The size of core 624 at one end of spot size converter 622 may match the size of the waveguide core of waveguide 628. Core 624 of spot size converter 622 may be inversely tapered from the fiber-waveguide interface to waveguide 628, where the size of core 624 in the x direction may gradually increase along the z direction as shown in FIG. 6C. The size of core 624 in the y direction may be constant or may vary along the z direction. The height of cladding layer 626 (in the y direction) may be constant, and the width of cladding layer 626 (in the x direction) may be constant or may vary along the z direction. Spot size converter 622 may include a cantilever portion. The cantilever portion may be formed by, for example, forming cladding layer 626 and core 624 on a buried oxide layer formed on substrate 610, and then selectively etching substrate 610 under spot size converter 622 to form an undercut region that may have a V-shape, the undercut region may be a part of the V-groove 612 or may be aligned with V-groove 612, such that fiber core 632 may align with core 624 of spot size converter 622.

Fiber core 632 of optical fiber 630 may have a cross-sectional area greater than the cross-sectional area of waveguide core of waveguide 628. The guided mode in optical fiber 630 may have a mode size (e.g., diameter) about a few microns, while the waveguide core may have a sub-micron linear dimension. Due to the large mode size mismatch, coupling losses from optical fiber 630 directly to waveguide 628 can be about 15 dB or higher. Spot size converter 622 may be used to reduce the coupling loss. Due to the small size of the tapered portion of core 624, the optical mode at the tapered portion may be weakly confined in core 624, and thus the size of the optical mode may increase in both the horizontal and vertical directions. At the interface between optical fiber 630 and spot size converter 622, core 624 may have the smallest size, and thus the optical mode may be less confined and thus may have a large size that may match the size of the optical mode of optical fiber 630. As the size of core 624 gradually increases along the z direction, the optical mode may be more and more confined in core 624 and thus the mode size may gradually decrease. At the interface between spot size converter 622 and waveguide 628, the optical mode may be reduced to have a size matching the mode size of waveguide 628. Therefore, the coupling efficiency between optical fiber 630 and waveguide 628 may be improved by spot size converter 622.

Figure 7A:
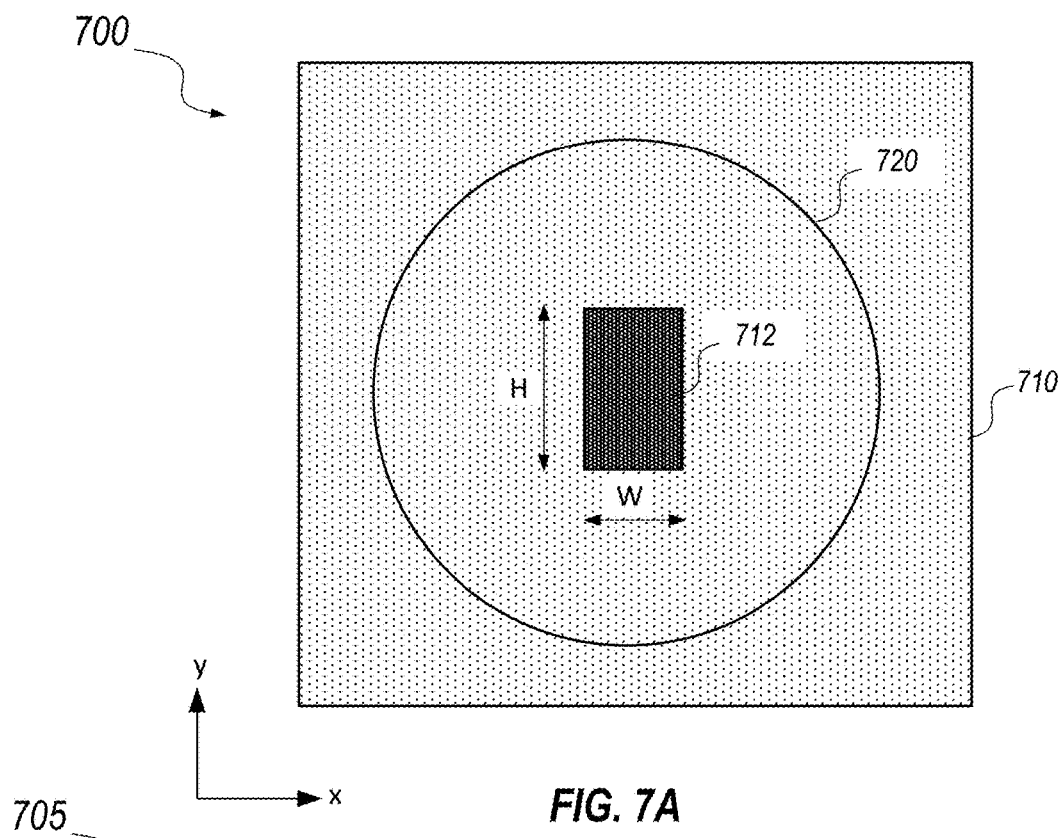
FIG. 7A illustrates an example of a spot size converter according to certain embodiments.

FIG. 7A illustrates an example of a spot size converter 700. Spot size converter 700 may be an example of spot size converter 622. FIG. 7A shows a cross-section of a cantilever portion of spot size converter 700, which may include a core 712 embedded in a cladding layer 710. Cladding layer 710 may include an oxide, such as silicon oxide. Core 712 may include a high-index material, such as SiN or Si. FIG. 7A also shows a fiber core 720, which may have a size much larger than core 712.

Figure 7B:
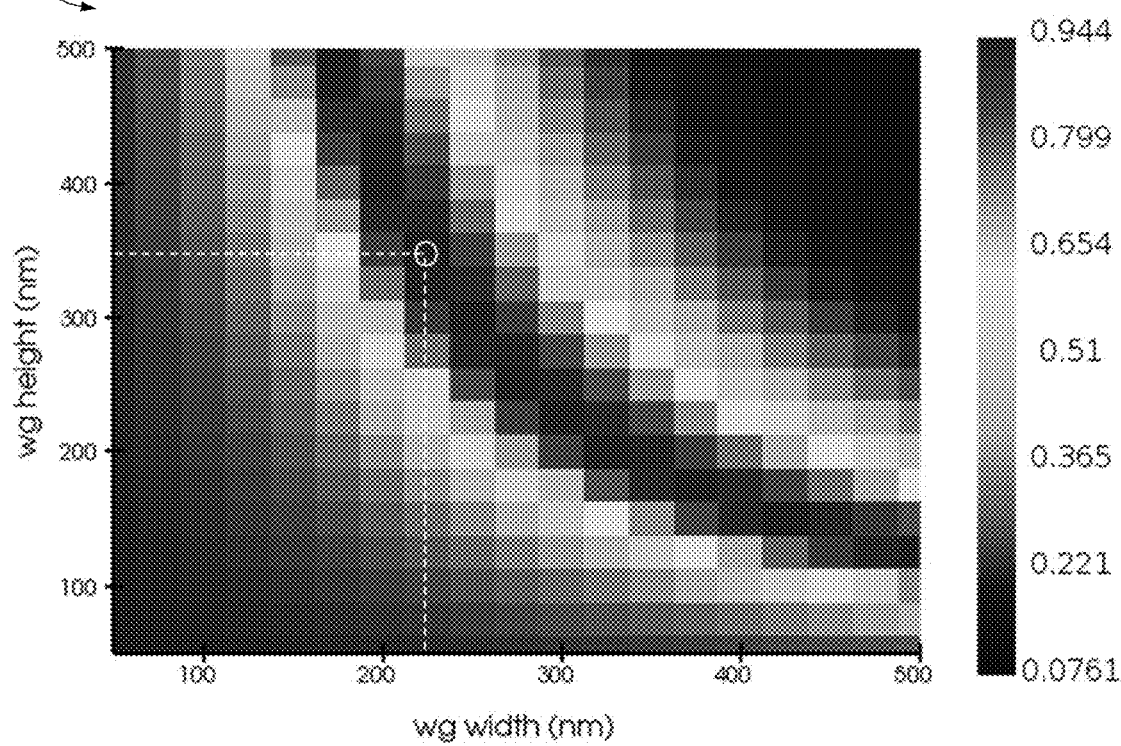
FIG. 7B illustrates simulated coupling efficiencies of examples of spot size converters having different core sizes according to certain embodiments.

FIG. 7B includes a diagram 705 illustrating simulated coupling efficiencies of examples of spot size converters 700 having different core sizes. In the illustrated example, the fiber may be an SMF-28 fiber, core 712 of spot size converter 700 may include SiN, cladding layer 710 of spot size converter 700 may include silicon oxide, and the optical mode guided by the optical fiber may be transverse electric (TE) mode and may have a wavelength about 1550 nm. FIG. 7B shows the simulated coupling efficiencies of spot size converters 700 with a width of core 712 varying from about 50 nm to about 500 nm and a height of core 712 varying from about 50 nm to about 500 nm. FIG. 7B shows that the maximum coupling efficiency of spot size converter 700 may be about 94.4%, and thus the minimum coupling loss is about 250 mdB.

As described above, optical quantum computing systems, such as system 400, may include waveguides, delay lines, switches, filters, photodetectors, single photon generation circuits, single photon detectors, resource state generation circuits, logical qubit detection circuits, and the like. Therefore, there may be many transitions between fibers and waveguides on a signal path. For example, pump photons may be coupled from a fiber to a waveguide that is coupled to a heralded single photon source (HSPS). The HSPS may generate a photon pair through a nonlinear process (e.g., SFWM). The two photons in the photon pair may be separated by, for example, a wavelength-division multiplexer (WDM), where one photon (heralding photon) of the photon pair detected by a single photon detector (e.g., an SNSPD) may herald the existence of the other photon (signal photon) in the pair. The signal photons may be used to implement qubits or to generate various entangled resource states and error-corrected photonic logical qubits. The qubits, resource states, and logic qubits may be delayed, fused, switched, and detected. The connections between die stacks or wafer-scale modules and the long delay lines may be implemented using low-loss optical fibers. Because of the many transitions between fibers and waveguides on a signal path, the total coupling loss can be high even if the coupling efficiency at each facet between a fiber and a waveguide can be as high as shown in FIG. 7B. In order to reduce the total loss, the coupling loss between a fiber and a waveguide may need to be further reduced.

According to certain embodiments, to better match the mode sizes of an optical fiber (e.g., a single mode fiber) and a waveguide thereby reducing the coupling loss at the interface between the optical fiber and the waveguide, a spot size converter that includes a cantilever having a tapered core (e.g., SiN or Si) surrounded by a primary cladding material (e.g., oxide) layer and a layer of a secondary cladding material (e.g., an epoxy, such as NTT E3810) having a slightly lower refractive index than the primary cladding material may be used to gradually change the mode size of the optical mode to match the mode sizes of the optical fiber and the waveguide. The tapered core may be tapered linearly or nonlinearly. The index contrast between the primary cladding material and the secondary cladding material may be within a certain range (e.g., between about 0.0015 and about 0.01 or higher). The spot size converter may have an inversely tapered (or straight and then inversely tapered, or sectionally changed) primary cladding layer for the waveguide. Parameters such as dimensions of the tapered core, dimensions of the primary cladding, and the index contrast between the primary cladding material and the secondary cladding material can be selected to achieve better performance.

Figure 8:
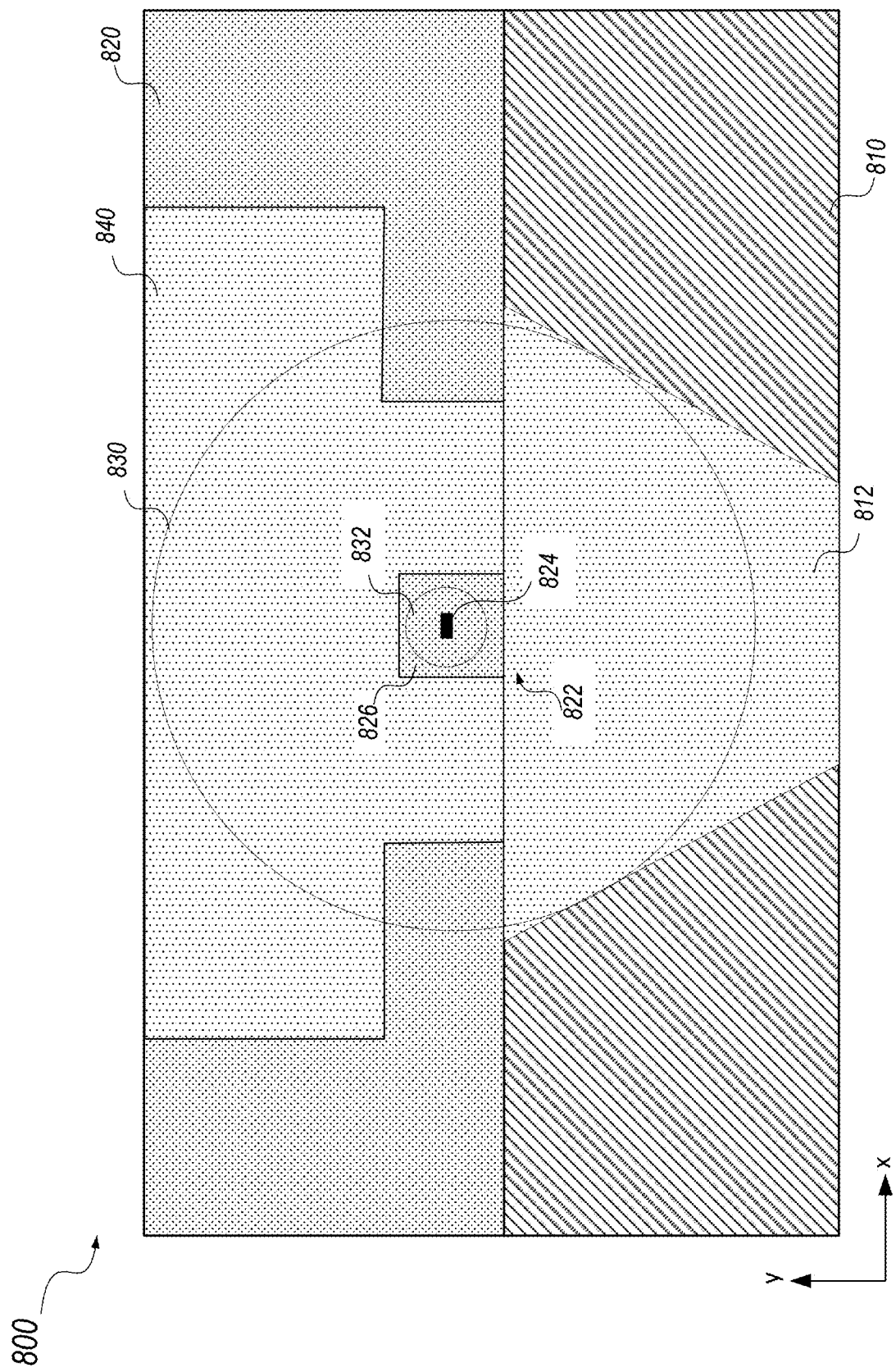
FIG. 8 illustrates an example of a structure that includes a spot size converter having a lower-index secondary cladding layer according to certain embodiments.

FIG. 8 illustrates an example of a structure 800 that includes a spot size converter 822 having a lower-index secondary cladding layer 840 according to certain embodiments. Structure 800 may include a substrate 810 (e.g., a silicon substrate) with a V-groove 812 formed thereon by, for example, selectively etching regions of substrate 810 under spot size converter 822 to form an isotropic undercut region. Spot size converter 822 may be formed in one or more oxide layers 820 and may be used to couple light from an optical fiber 830 into a waveguide in oxide layers 820, where the core of the waveguide may be smaller than a fiber core 832 of optical fiber 830. As illustrated, spot size converter 822 may include a core 824 surrounded by a primary cladding layer 826. Core 824 may be tapered as described above and below. Primary cladding layer 826 may have a cross-sectional size greater than the cross-sectional size of fiber core 832. Primary cladding layer 826 may be surrounded by a secondary cladding layer 840, which may include a material having a refractive index slightly lower than the refractive index of primary cladding layer 826. Secondary cladding layer 840 may include an organic material, such as an epoxy (e.g., NTT E3810), and may be applied (e.g., injected or otherwise deposited) after optical fiber 830 is positioned on V-groove 812 and aligned with spot size converter 822. Secondary cladding layer 840 may fill gaps in the vicinity of spot size converter 822, and may also help to secure optical fiber 830 on V-groove 812.

Compared with structure 600 where air gaps may surround cladding layer 626, structure 800 may have a low refractive index contrast between primary cladding layer 826 and its surrounding media (e.g., secondary cladding layer 840). Therefore, the optical mode field size in spot size converter 822 may be larger than the optical mode field size in spot size converter 622, and thus may better match with optical mode field size of optical fiber 830.

FIGS. 9A-9C illustrate an example of a structure 900 including a spot size converter 922 according to certain embodiments. Spot size converter 922 can be used to, for example, couple light between EPIC die stacks 312 of FIG. 3, couple light between wafer-scale modules 410 of FIG. 4, couple light between two ports of a wafer-scale module 410 of FIG. 4, or couple light from optical fibers 562 to waveguides 524 or from waveguides 524 to optical fibers 562 in wafer-scale module 500 of FIG. 5. FIG. 9A shows an x-y cross-section of a portion of structure 900. FIG. 9B shows a y-z cross-section of a portion of structure 900. FIG. 9C shows an x-z cross-section of a portion of structure 900. In the illustrated example, structure 900 includes a substrate 910 (e.g., a silicon handle wafer). Oxide layers 920, waveguides (e.g., a waveguide 950), and other photonic integrated circuits may be formed on substrate 910 using semiconductor processing techniques. Oxide layers 920 may include one or more oxide layers (e.g., $SiO_2$) deposited on substrate 910, such as a buried oxide (BOX) layer 926 and an oxide layer 928 deposited on substrate 910 before the deposition of the waveguide core layer, and an oxide layer 927 and an oxide layer 925 deposited after the formation of waveguide cores (e.g., after patterning the waveguide core layer). Waveguide 950 may include a waveguide core (e.g., SiN or Si) and waveguide cladding layers (e.g., oxide layers 925-928).

An optical fiber 930 may be coupled to waveguide 950 through spot size converter 922. Optical fiber 930 may include a fiber core 932 and may be positioned in a V-groove (an undercut region) formed in substrate 910 under spot size converter 922 such that fiber core 932 may be aligned with spot size converter 922. Fiber core 932 may have a diameter about a few microns, whereas waveguide core of waveguide 950 may have a linear dimension about a few hundred nanometers. Therefore, direct coupling between optical fiber 930 and waveguide 950 may have a low coupling efficiency.

Spot size converter 922 may include a core 924 and a cladding layer formed by oxide layers 920 (e.g., oxide layers 925-928). Core 924 may be formed in the waveguide core layer and may include a high index material (e.g., SiN or Si).

The cladding layer may be formed by etching oxide layers 925-928. The size of core 924 at one end of spot size converter 922 may match the size of the waveguide core of waveguide 950. Core 924 of spot size converter 922 may be inversely tapered from an end closer to optical fiber 930 to an end closer to waveguide 950, where the width of core 924 in the x direction may gradually increase along the z direction as shown in FIG. 9C. The height of core 924 in the y direction may be constant along the z direction as shown in FIG. 9B or may vary along the z direction. The height of the cladding layer (in the y direction) of spot size converter 922 may also be constant along the z direction as shown in FIG. 9B or may vary along the z direction. Spot size converter 922 may include a cantilever portion above the undercut region of substrate 910. The cantilever portion may be formed by, for example, forming oxide layers 920 and core 924 on substrate 910 and selectively etching substrate 910 under spot size converter 922 to form an undercut region that may have a V-shape. The width of the cladding layer (in the x direction) of the cantilever portion of spot size converter 922 may also be inversely tapered along the z direction as shown in FIG. 9C. The cantilever portion of spot size converter 922 may have a non-zero distance from optical fiber 930. In some embodiments, core 924 may be recessed from the end of spot size converter 922 that is close to optical fiber 930.

In the example shown in FIGS. 9A-9C, the cladding layer of spot size converter 922 may be surrounded by a secondary cladding layer 940, which may include a material having a refractive index slightly lower than the refractive index of the cladding layer (e.g., oxide layers 920). Secondary cladding layer 940 may include an organic material, such as an epoxy, and may be applied (e.g., injected or otherwise deposited) after optical fiber 930 is positioned on the V-groove and aligned with spot size converter 922. Secondary cladding layer 940 may fill gaps in the vicinity of spot size converter 922 and may also secure optical fiber 930 on the V-groove.

As described above, due to the small size of the tapered portion of core 924 and the low index contrast between oxide layers 920 and secondary cladding layer 940, the optical mode at the cantilever portion of spot size converter 922 may be weakly confined in core 924, and thus the size of the optical mode may increase in both the horizontal and vertical directions. Core 924 of spot size converter 922 at the end closer to optical fiber 930 may have the smallest size, and thus the optical mode may be less confined and thus may have a large size that may match the size of the optical mode of optical fiber 930. As the size of core 924 gradually increases along the z direction, the optical mode may be more and more confined in core 924 and thus the mode size may gradually decrease. At the interface between spot size converter 922 and waveguide 950, the optical mode may be reduced to have a size matching the mode size of waveguide 950. Therefore, the coupling efficiency between optical fiber 930 and waveguide 950 may be improved by spot size converter 922.

FIGS. 10A-10C illustrate another example of a structure 1000 including a spot size converter 1022 according to certain embodiments. FIG. 10A shows an x-y cross-section of a portion of structure 1000 and a zoom-in view of a smaller portion. FIG. 10B shows an x-z cross-section of a portion of structure 1000. FIG. 10C shows a y-z cross-section of a portion of structure 1000. In the illustrated example, structure 1000 includes a substrate 1010 (e.g., a silicon handle wafer). One or more oxide layers 1020, waveguides (e.g., a waveguide 1050), and other photonic integrated circuits may be formed on substrate 1010 using semiconductor processing techniques. Waveguide 1050 may include a waveguide core (e.g., SiN or Si) and waveguide cladding layers (e.g., oxide layers 1020).

An optical fiber 1030 may be coupled to waveguide 1050 through spot size converter 1022. Optical fiber 1030 may include a fiber core 1032 and may be positioned in a V-groove or U-groove (e.g., an undercut region 1012) formed in substrate 1010 under spot size converter 1022, such that fiber core 1032 may be aligned with spot size converter 1022. Fiber core 1032 may have a diameter about a few microns, whereas waveguide core of waveguide 1050 may have a linear dimension about a few hundred nanometers. Therefore, direct coupling between optical fiber 1030 and waveguide 1050 may have a low coupling efficiency.

Spot size converter 1022 may include a core 1024 and a cladding layer (e.g., oxide layers 1020). Core 1024 may be formed in a waveguide core layer and may include a high index material (e.g., SiN or Si). The size of core 1024 at one end of spot size converter 1022 may match the size of the waveguide core of waveguide 1050. Core 1024 of spot size converter 1022 may be inversely tapered from an end closer to optical fiber 1030 to an end closer to waveguide 1050, where the width of core 1024 in the x direction may gradually increase along the z direction as shown in FIG. 10B. The height of core 1024 in the y direction may be constant along the z direction as shown in FIG. 10C or may vary along the z direction. The height of the cladding layer (in the y direction) of spot size converter 1022 may also be constant along the z direction as shown in FIG. 10C or may vary along the z direction. Spot size converter 1022 may include a cantilever portion above the undercut region 1012 of substrate 1010. The cantilever portion may be formed by, for example, forming oxide layers 1020 and core 1024 on substrate 1010, and then selectively etching substrate 1010 under spot size converter 1022 to form an undercut region 1012 that may have a V-shape or U-shape. The width of the cladding layer (in the x direction) of the cantilever portion of spot size converter 1022 may be constant at a first portion of spot size converter 1022 that is closer to optical fiber 1030, and may also be inversely tapered along the z direction in a second portion 1026 of spot size converter 1022 as shown in FIG. 10B. The cantilever portion of spot size converter 1022 may have a non-zero distance from optical fiber 1030. In some embodiments, core 1024 may be recessed from the end of spot size converter 1022 that is close to optical fiber 1030. In the illustrated example, oxide ribs 1028 may be formed in oxide layers 1020 between the cantilever portion of spot size converter 1022 and other regions of oxide layers 1020 to provide mechanical support for spot size converter 1022.

In the example shown in FIGS. 10A-10C, the cladding layer (e.g., oxide layers 1020) of spot size converter 1022 may be surrounded by a secondary cladding layer 1040, which may include a material having a refractive index slightly lower than the refractive index of the cladding layer. Secondary cladding layer 1040 may include an organic material, such as an epoxy, and may be applied (e.g., injected or otherwise deposited) after optical fiber 1030 is positioned on the V-groove or U-groove and aligned with spot size converter 1022. Secondary cladding layer 1040 may fill gaps in the vicinity of spot size converter 1022, including undercut region 1012.

As described above, due to the small size of the tapered core 1024 and the low index contrast between cladding layer (e.g., oxide layers 1020) and secondary cladding layer 1040, the optical mode at the cantilever portion of spot size converter 1022 may be weakly confined in core 1024, and thus the size of the optical mode may increase in both the horizontal and vertical directions. Core 1024 of spot size converter 1022 at the end closer to optical fiber 1030 may have the smallest size, and thus the optical mode may be less confined and thus may have a large size that may match the size of the optical mode of optical fiber 1030. As the size of core 1024 gradually increases along the z direction, the optical mode may be more and more confined in core 1024 and thus the mode size may gradually decrease. At the interface between spot size converter 1022 and waveguide 1050, the optical mode may be reduced to have a size matching the mode size of waveguide 1050. Therefore, the coupling efficiency between optical fiber 1030 and waveguide 1050 may be improved by spot size converter 1022.

Figure 11B:
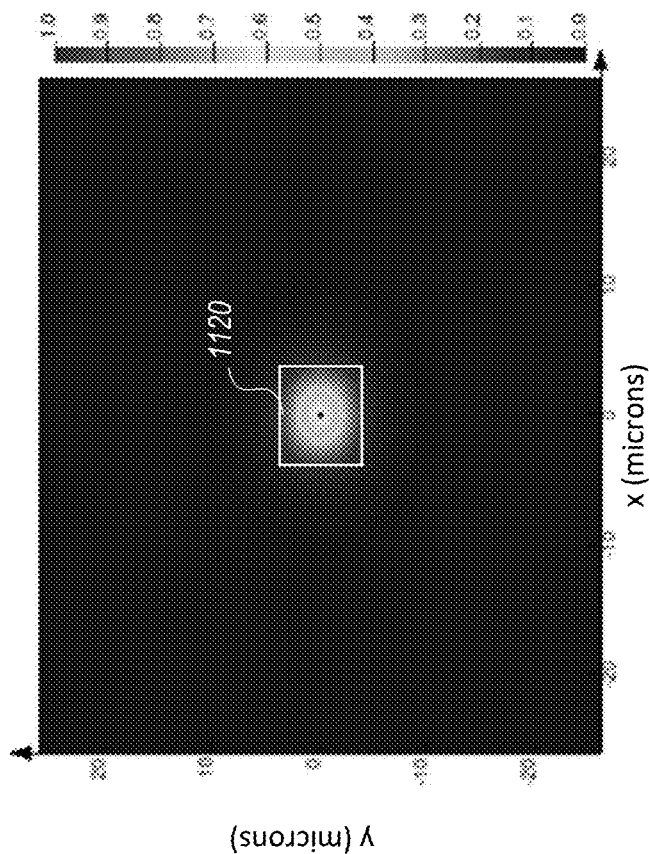
FIG. 11B illustrates an example of a mode field of a guided optical mode converted by a spot size converter according to certain embodiments.
Figure 11A:
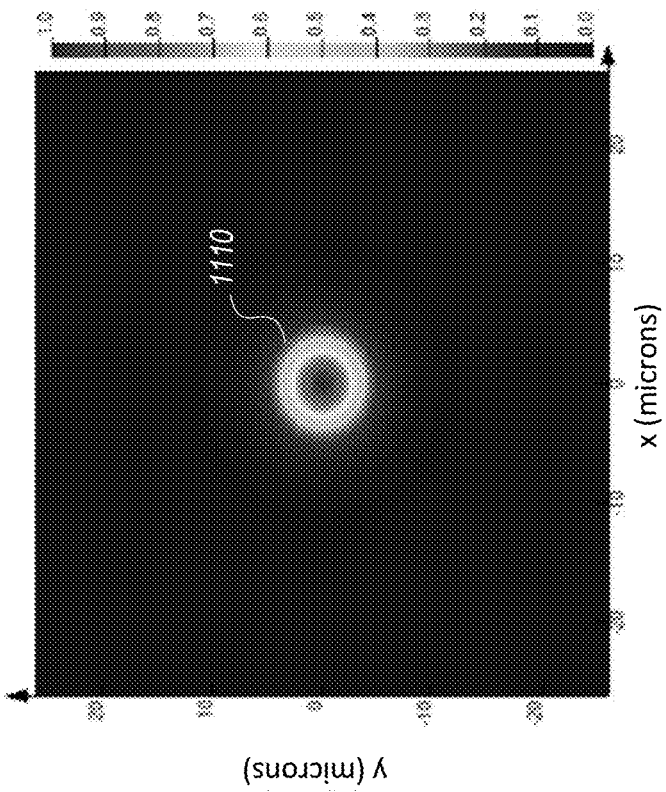
FIG. 11A illustrates an example of a mode field of a guided optical mode in an optical fiber according to certain embodiments.

FIG. 11A illustrates an example of a mode field 1110 of a guided optical mode in an optical fiber according to certain embodiments. In the illustrated example, the optical fiber may include an SMF-28 fiber, and the wavelength of the guided optical mode may be about 1550 nm. FIG. 11A shows that the diameter of mode field 1110 may be about a few microns.

FIG. 11B illustrates an example of a mode field 1120 of a guided optical mode converted by a spot size converter (e.g., spot size converter 822, 922, or 1022) according to certain embodiments. In the illustrated example, the cross-sectional area of the primary cladding layer (SiO$_2$) of the spot size converter may be about 7.7 µm×7.7 µm. The tapered waveguide core (SiN) of the spot size converter may be in the center of primary cladding layer. The tip of the tapered waveguide core (SiN) of the spot size converter may have a size about 80 nm×80 nm. The refractive index difference between the primary cladding layer and the secondary cladding layer may be about 0.003. FIG. 11B shows that the spot size (diameter) of the guided optical mode may be about less than about 500 nm×500 nm. The coupling efficiency may be as high as 99.8% (or a loss about 8 mdB), which may be further optimized by tuning, for example, the dimension of the primary cladding layer and the dimension of the core of the spot size converter, and the refractive indices of the core, the primary cladding layer, and the secondary cladding layer.

Figure 12A:
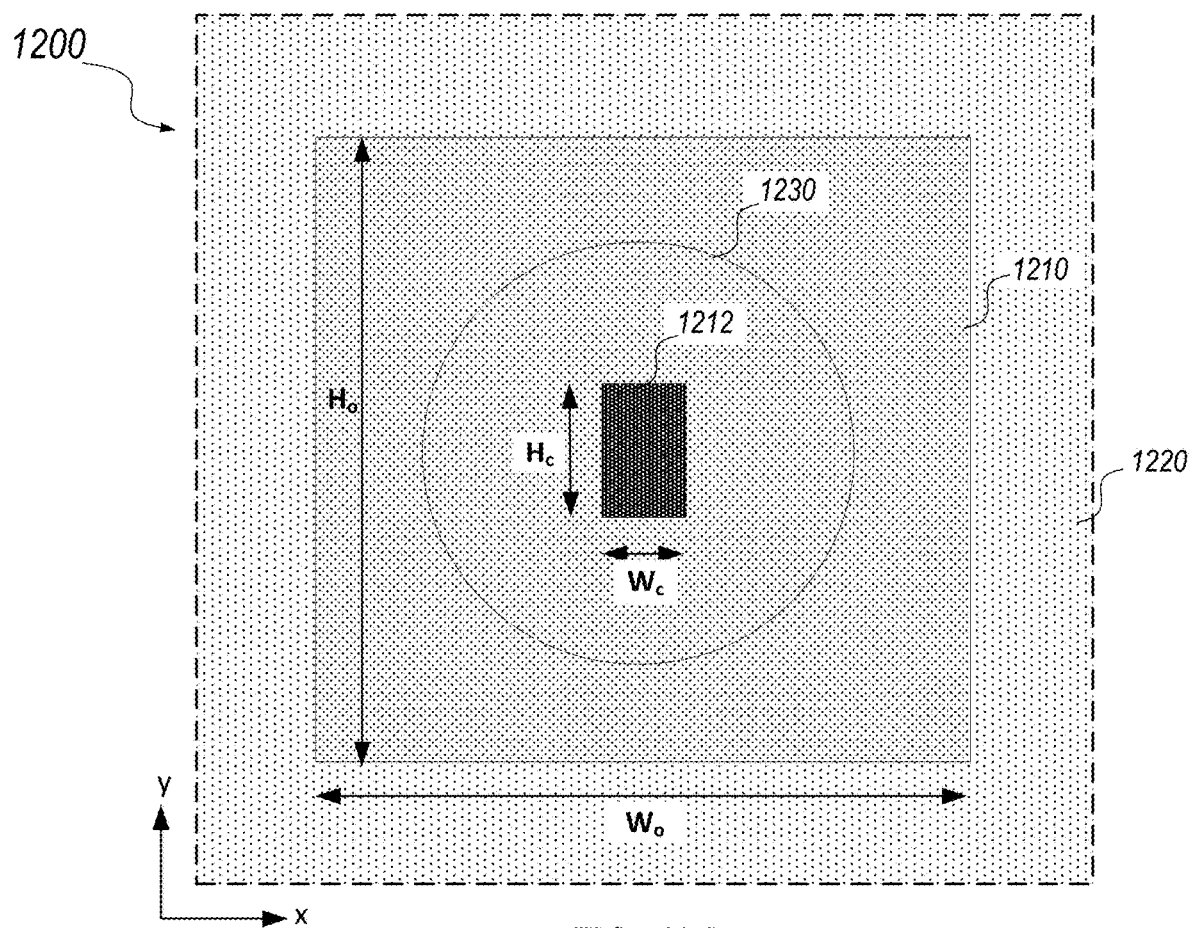
FIG. 12A illustrates an example of a spot size converter including a lower-index secondary cladding layer according to certain embodiments.

FIG. 12A illustrates an example of a spot size converter 1200 including a lower-index secondary cladding layer 1220 according to certain embodiments. As described above and shown in FIG. 12A, spot size converter 1200 may be used to couple light from an optical fiber having a fiber core 1230 to a waveguide (e.g., a SiN waveguide) in a primary cladding layer 1210 (e.g., SiO$_2$). Primary cladding layer 1210 may be surrounded by secondary cladding layer 1220, such as an epoxy or another organic or inorganic material having a lower refractive index than primary cladding layer 1210. Primary cladding layer 1210 may have a width $W_o$ and a height $H_o$. A tapered core 1212 of spot size converter 1200 may have a height $H_c$ and a width $W_c$ at the smaller end.

Figure 12B:
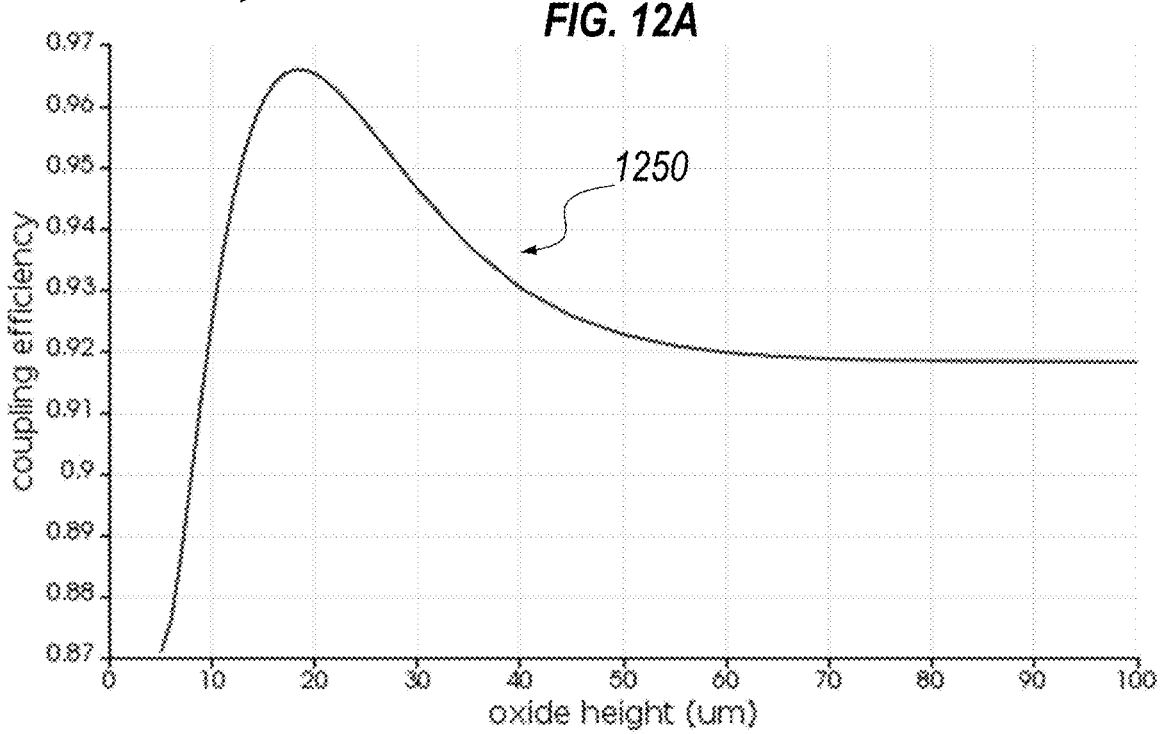
FIG. 12B includes a curve showing the simulated coupling efficiency of an example of a spot size converter as a function of the primary cladding layer thickness.

FIG. 12B includes a curve 1250 showing the simulated coupling efficiency of spot size converter 1200 as a function of the primary cladding layer thickness. In the illustrated example, the optical fiber may include an SMF-28 fiber, the guided optical mode may be TE mode, and the wavelength of the guided optical mode may be about 1550 nm. The width $W_c$ of tapered core 1212 at the smaller end may be about 210 nm, and the height He of tapered core 1212 may be about 350 nm. The width $W_o$ and the height $H_o$ of primary cladding layer 1210 (SiO$_2$) may be about the same. The refractive index contrast between primary cladding layer 1210 and secondary cladding layer 1220 may be about 0.003. FIG. 12B shows that, when the width $W_o$ and the height $H_o$ of primary cladding layer 1210 (SiO$_2$) is about 18 µm, the coupling efficiency may be about 96.5% (or a loss about 150 mdB), which may be further optimized by tuning other parameters. The performance of spot size converter 1200 for TM mode may be about the same.

FIG. 13A includes a diagram 1300 illustrating the simulated coupling efficiency of spot size converter 1200 as a function of the width $W_c$ of tapered core 1212 at the smaller end and the height $H_o$(and width $W_o$) of primary cladding layer 1210 (SiO$_2$) of spot size converter 1200. In the illustrated example, the optical fiber may include an SMF-28 fiber, the guided optical mode may be TE mode, and the wavelength of the guided optical mode may be about 1550 nm. The height $H_c$ of tapered core 1212 may be about 350 nm. The width $W_o$ and the height $H_o$ of primary cladding layer 1210 (SiO$_2$) may be about the same. The refractive index contrast between primary cladding layer 1210 and secondary cladding layer 1220 may be about 0.003. FIG. 13A shows that, when the width $W_c$ of tapered core 1212 at the smaller end is about 120 nm and the width $W_o$ and the height $H_o$ of primary cladding layer 1210 (SiO$_2$) is about 8.8 µm, the coupling efficiency can be greater than 99% (or a loss less than about 43 mdB).

FIG. 13B includes a curve 1310 illustrating the simulated coupling efficiency of spot size converter 1200 as a function of the width $W_c$ of tapered core 1212 at the smaller end when the height $H_o$ and width $W_o$ of primary cladding layer 1210 are fixed (e.g., about 8.8 µm) and the height $H_c$ of tapered core 1212 is fixed (e.g., about 350 nm). Curve 1310 shows that, when the height $H_o$ and width $W_o$ of primary cladding layer 1210 are fixed at about 8.8 µm, the coupling efficiency of spot size converter 1200 may be the highest (e.g., greater than about 99.5%) when the width $W_c$ of tapered core 1212 at the smaller end is about 120 nm.

FIG. 13C includes a curve 1320 illustrating the simulated coupling efficiency of spot size converter 1200 as a function of the height $H_o$(and width $W_o$) of primary cladding layer 1210 when the width $W_c$ of tapered core 1212 at the smaller end is fixed (e.g., about 120 nm) and the height $H_c$ of tapered core 1212 is fixed (e.g., about 350 nm). Curve 1320 shows that, when the width $W_c$ of tapered core 1212 at the smaller end is fixed at about 120 nm and the height $H_c$ of tapered core 1212 is about 350 nm, the coupling efficiency of spot size converter 1200 may be the highest (e.g., greater than about 99.6%) when the height $H_o$ (and width $W_o$) of primary cladding layer 1210 is between about 8 and about 9.5 µm.

Figure 14:
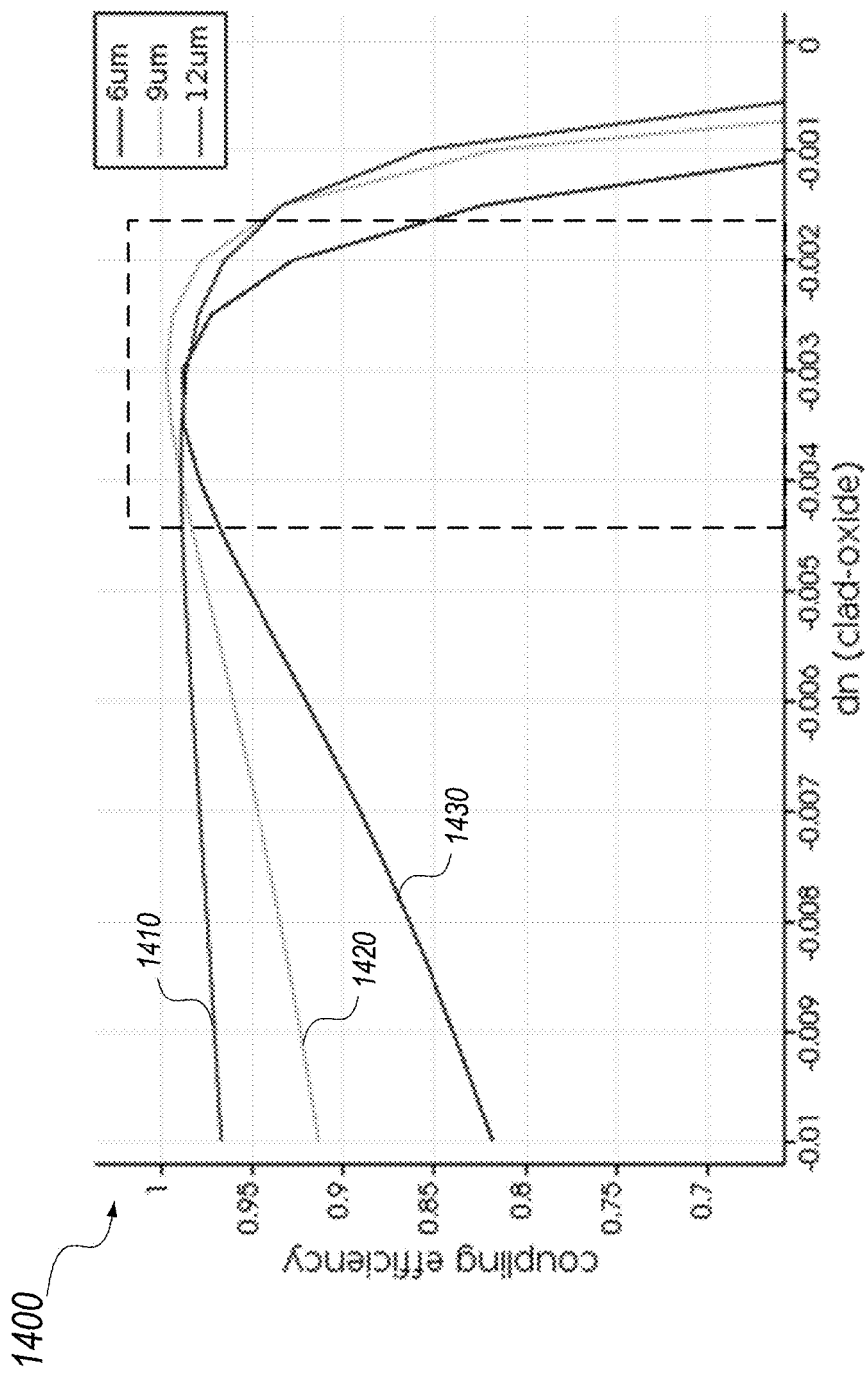
FIG. 14 illustrates the simulated coupling efficiency of an example of a spot size converter as a function of the refractive index contrast between the primary cladding layer and the secondary cladding layer of the spot size converter according to certain embodiments.

FIG. 14 includes a chart 1400 illustrating the simulated coupling efficiency of spot size converter 1200 as a function of the refractive index contrast between the primary cladding layer 1210 and the secondary cladding layer 1220. In the illustrated example, the optical fiber may include an SMF-28 fiber, the guided optical mode may be TE mode, and the wavelength of the guided optical mode may be about 1550 nm. The width $W_c$ of tapered core 1212 at the smaller end may be about 120 nm, and the height $H_c$ of tapered core 1212 may be about 350 nm. The width $W_o$ and the height $H_o$ of primary cladding layer 1210 (SiO$_2$) may be about the same. A curve 1410 shows the simulated coupling efficiency of spot size converter 1200 as a function of the refractive index contrast between the primary cladding layer 1210 and the secondary cladding layer 1220 when the width $W_o$ and the height $H_o$ of primary cladding layer 1210 is about 6 µm. A curve 1420 shows the simulated coupling efficiency of spot size converter 1200 as a function of the refractive index contrast between the primary cladding layer 1210 and the secondary cladding layer 1220 when the width $W_o$ and the height $H_o$ of primary cladding layer 1210 is about 9 µm. A curve 1430 shows the simulated coupling efficiency of spot size converter 1200 as a function of the refractive index contrast between the primary cladding layer 1210 and the secondary cladding layer 1220 when the width $W_o$ and the height $H_o$ of primary cladding layer 1210 is about 12 µm.

Curves 1410-1430 show that the maximum coupling efficiency may be achieved when the refractive index contrast is between about 0.0015 and about 0.01 or higher, where the peak coupling efficiency may be achieved when the refractive index contrast is about 0.003. The peak coupling efficiency may be achieved when the width $W_o$ and the height $H_o$ of primary cladding layer 1210 is about 9 µm. A flatter coupling efficiency as a function of the refractive index contrast may be obtained when the width $W_o$ and the height $H_o$ of primary cladding layer 1210 is larger, at the cost of a lower peak coupling efficiency. Even though not shown in FIGS. 12B-14, the performance of spot size converter 1200 may be about the same for TM mode and TE mode.

FIGS. 15A and 15B illustrate an example of a spot size converter 1500 including a lower-index secondary cladding layer 1520 according to certain embodiments. Spot size converter 1500 may be used to couple light from an optical fiber 1530 having a fiber core 1532 to a waveguide core (e.g., SiN) in a primary cladding layer 1510 (e.g., SiO$_2$). Primary cladding layer 1510 may be surrounded by secondary cladding layer 1520, such as an epoxy or another organic or inorganic material having a lower refractive index than primary cladding layer 1510. In the illustrated example, there may be a gap between an optical fiber 1530 and the tip of spot size converter 1500, and a tapered core 1512 of spot size converter 1500 may be recessed from the tip of spot size converter 1500.

FIG. 15C illustrates the simulated coupling efficiency of spot size converter 1500 as a function of a gap between optical fiber 1530 and spot size converter 1500 or the recess of tapered core 1512 from the tip of spot size converter 1500. A curve 1550 in FIG. 15C shows the simulated coupling efficiency of spot size converter 1500 as a function of the recess of tapered core 1512 from the tip of spot size converter 1500. A curve 1560 in FIG. 15C shows the simulated coupling efficiency of spot size converter 1500 as a function of the gap between optical fiber 1530 and spot size converter 1500. FIG. 15C shows that the coupling efficiency may be reduced when the gap and/or the recess increase.

FIGS. 16A-16C illustrate examples of spot size converters according to certain embodiments. FIG. 16A shows a spot size converter 1600 including a tapered core 1620 in the center of an oxide slab 1610 (the primary cladding layer). Below and above oxide slab 1610 is secondary cladding layers 1630, which may have a refractive index lower than the refractive index of oxide slab 1610. A fiber core 1640 may be aligned with tapered core 1620, where the center of fiber core 1640 may align with the center of tapered core 1620.

FIG. 16B shows a spot size converter 1602 including a tapered core 1622 in a primary cladding layer 1612. Primary cladding layer 1612 is surrounded by a secondary cladding layer 1632. Primary cladding layer 1612 may have a square or a rectangular cross-sectional area. Secondary cladding layer 1632 may have a refractive index slightly lower (e.g., about 0.003)) than the refractive index of primary cladding layer 1612. The center of tapered core 1622 may be vertically (in the y direction) offset from the center of primary cladding layer 1612. The center of a fiber core 1642 may align with the center of primary cladding layer 1612. Fiber core 1642 may be aligned with tapered core 1622 in the x direction, but may be offset from tapered core 1622 in the y direction.

FIG. 16C shows a spot size converter 1604 including a tapered core 1624 in an oxide slab 1614 (the primary cladding layer). Below and above oxide slab 1614 is secondary cladding layers 1634, which may have a refractive index slightly lower (e.g., about 0.003) than the refractive index of the primary cladding layer (e.g., oxide slab 1614). The center of tapered core 1624 may be vertically (in the y direction) offset from the center of the primary cladding layer. The center of a fiber core 1644 may align with the center of the primary cladding layer, but may be offset from the center of tapered core 1622 in the y direction.

Figure 17A:
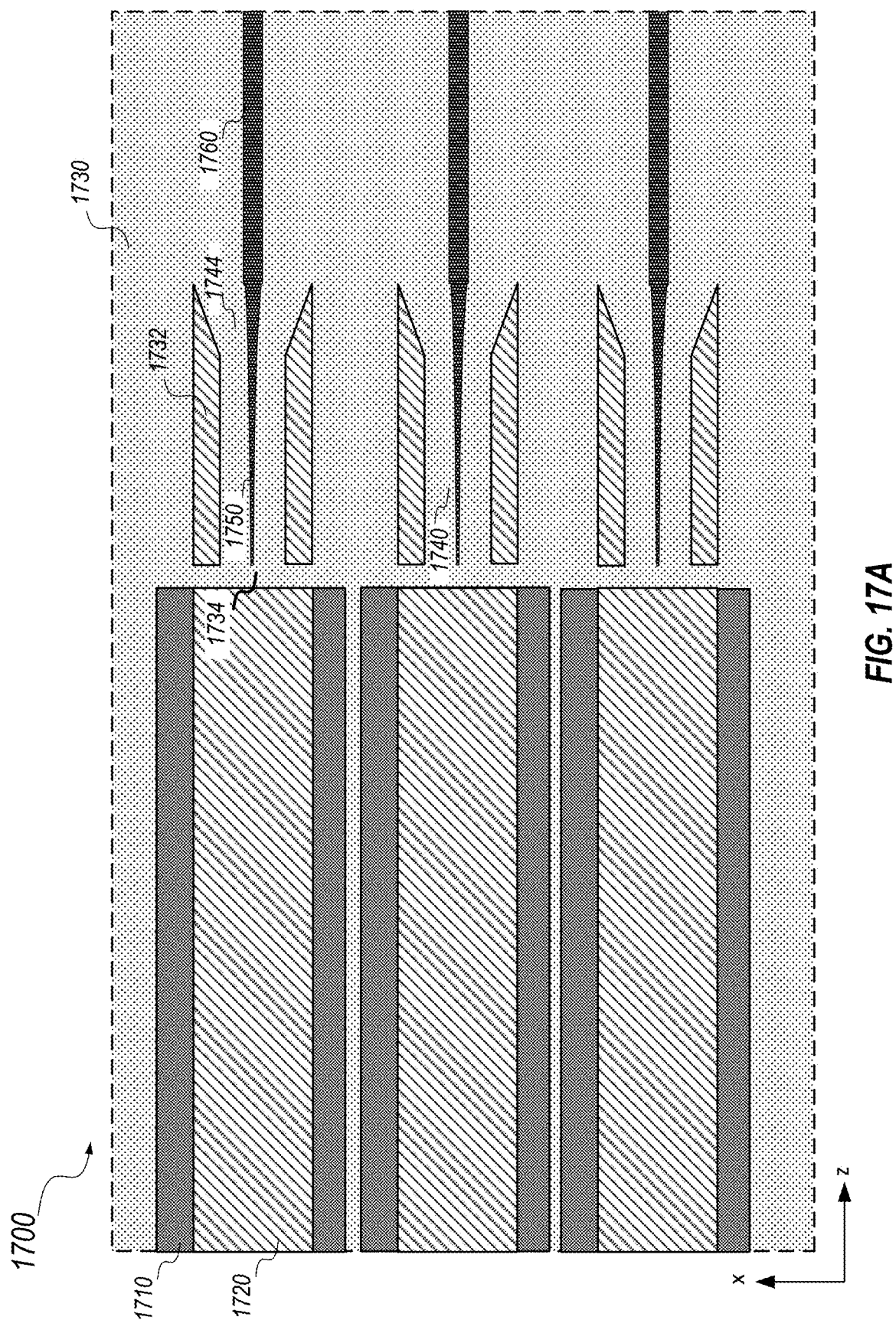
FIG. 17A illustrates an example of an array of spot size converters for coupling light between an array of optical fibers and an array of waveguides according to certain embodiments.
Figure 17B:
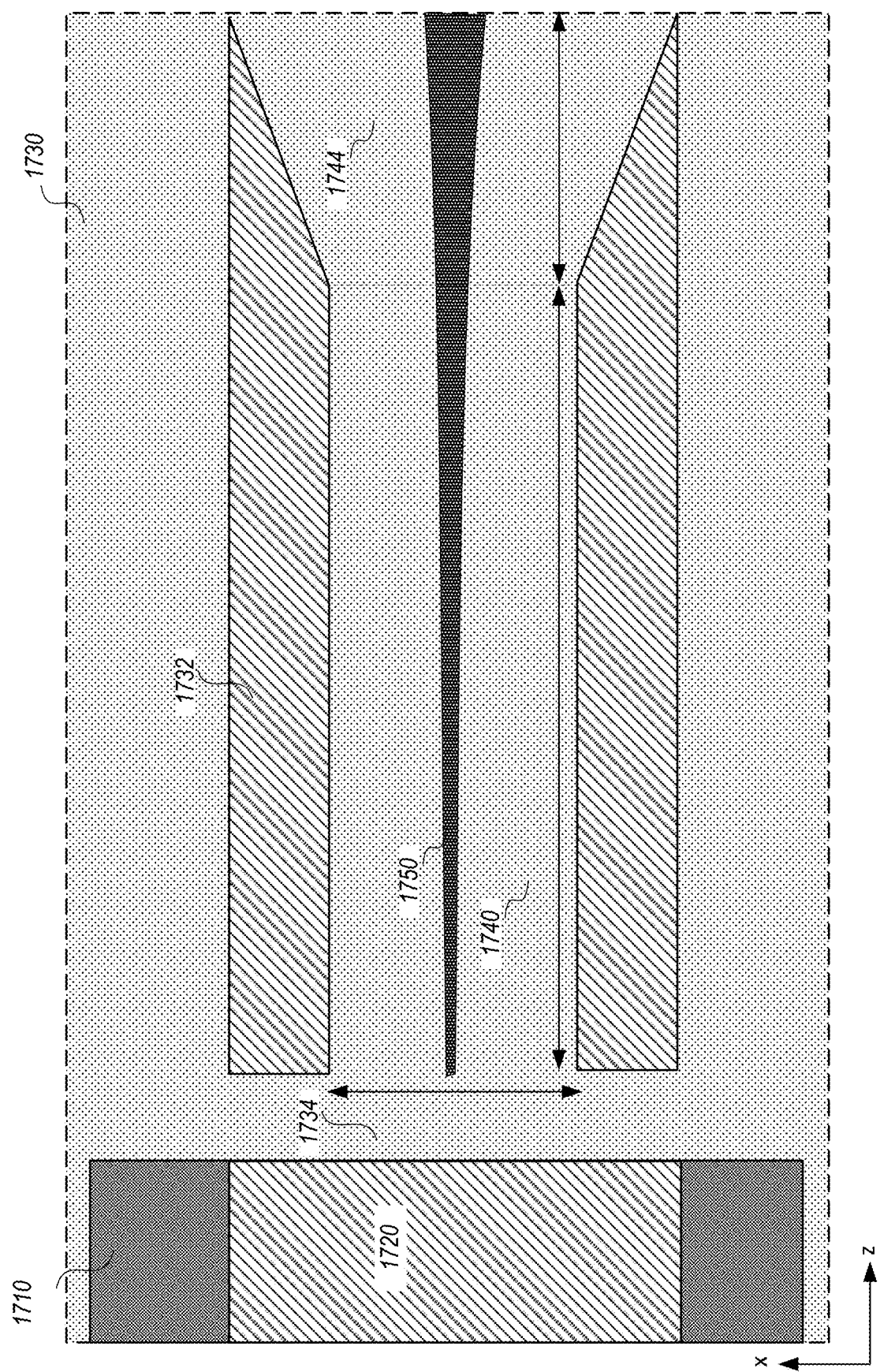
FIGS. 17B and 17C illustrate an example of a spot size converter in the array of spot size converters of FIG. 17A according to certain embodiments.
Figure 17C:
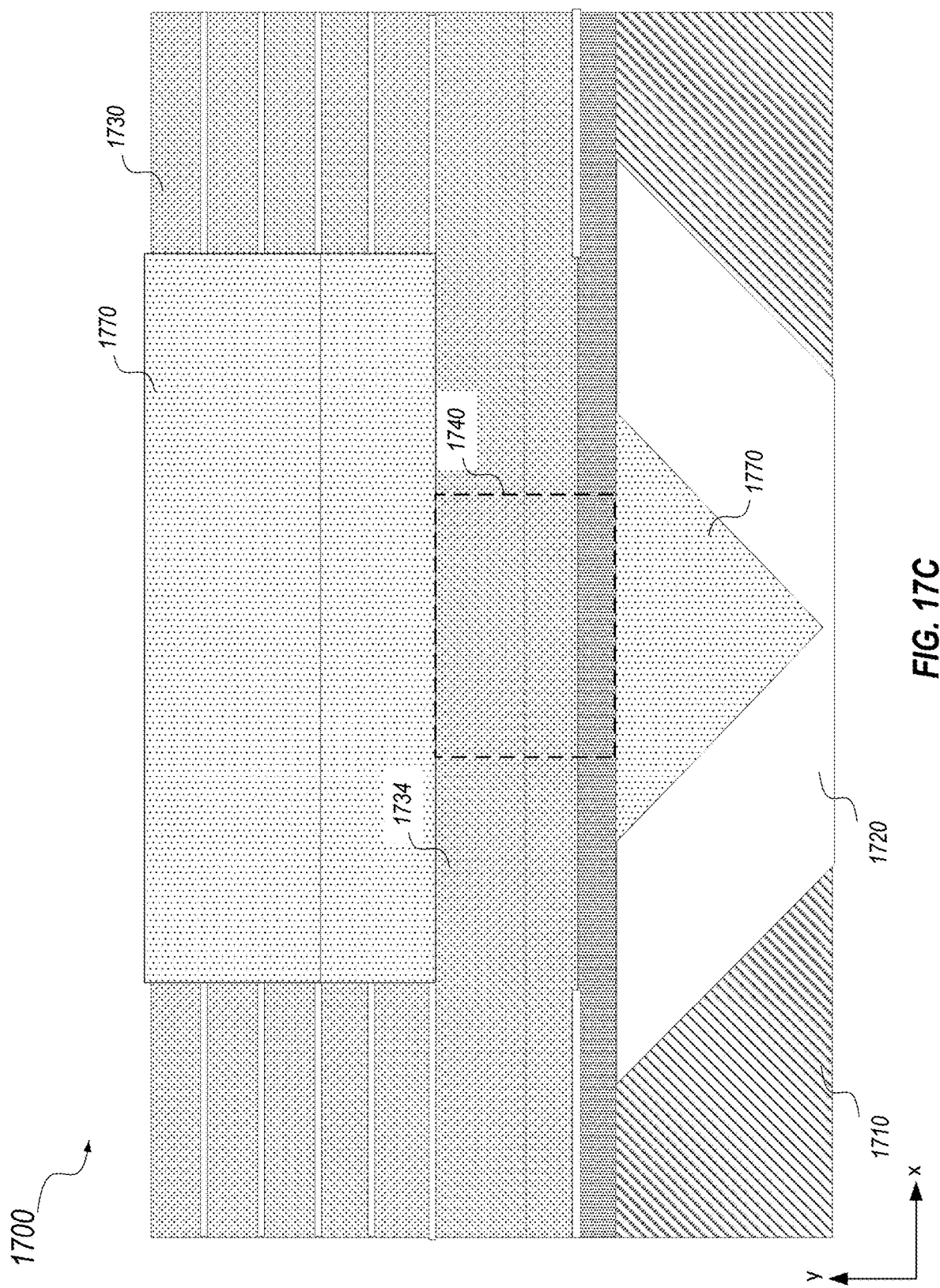

FIG. 17A illustrates an example of a structure 1700 including an array of spot size converters 1740 for coupling light between an array of optical fibers and an array of waveguides according to certain embodiments. FIG. 17B is a zoom-in top view of an example of a spot size converter 1740 in the array of spot size converters 1740 of FIG. 17A. FIG. 17C is a cross-sectional view of an example of a spot size converter 1740 in the array of spot size converters 1740 of FIG. 17A. Structure 1700 may include a substrate 1710 (e.g., a silicon handle wafer), one or more oxide layers 1730 formed on substrate 1710, an array of waveguide cores 1760 formed on a waveguide core layer within oxide layers 1730. Structure 1700 may also include an array of spot size converters 1740 formed in oxide layers 1730.

Each spot size converter 1740 may include a cantilever portion formed by etching regions 1732 of the one or more oxide layers 1730 and etching portions of substrate 1710 under spot size converters 1740 to form undercut regions 1720, where each undercut region 1720 may have a V-shape or U-shape and may be used as a fiber alignment structure to align and position an optical fiber. Each spot size converter 1740 may include a core 1750 formed in the waveguide core layer, where the width of core 1750 in the x direction may be inversely tapered (e.g., increase linearly or nonlinearly) in the z direction. The width of oxide layers 1730 in the x direction in the cantilever portion may also be inversely tapered (e.g., gradually increase) in the z direction or may be constant first and then inversely tapered (as shown by regions 1744) along the z direction. A region 1734 of oxide layers 1730 may not be etched, and thus may mechanically connect the cantilever portions of spot size converters 1740 to other unetched portions of oxide layers 1730 supported by substrate 1710 to provide mechanical support for the cantilever portions of spot size converters 1740, thereby increasing the stability and reliability of spot size converters 1740.

As shown in FIG. 17C, a secondary cladding material may be deposited on a spot size converter 1740 to fill the gaps surrounding oxide layers 1730 (primary cladding layer) to form a secondary cladding layer 1770. As described above, the secondary cladding material may include an epoxy or another organic or inorganic material that has a refractive index slightly lower than the refractive index of oxide layers 1730, such as about 0.003 lower than the refractive index of oxide layers 1730. The secondary cladding material may at least partially fill the undercut regions 1720 and may help to secure optical fibers on the V-grooves or U-grooves.

Figure 18:
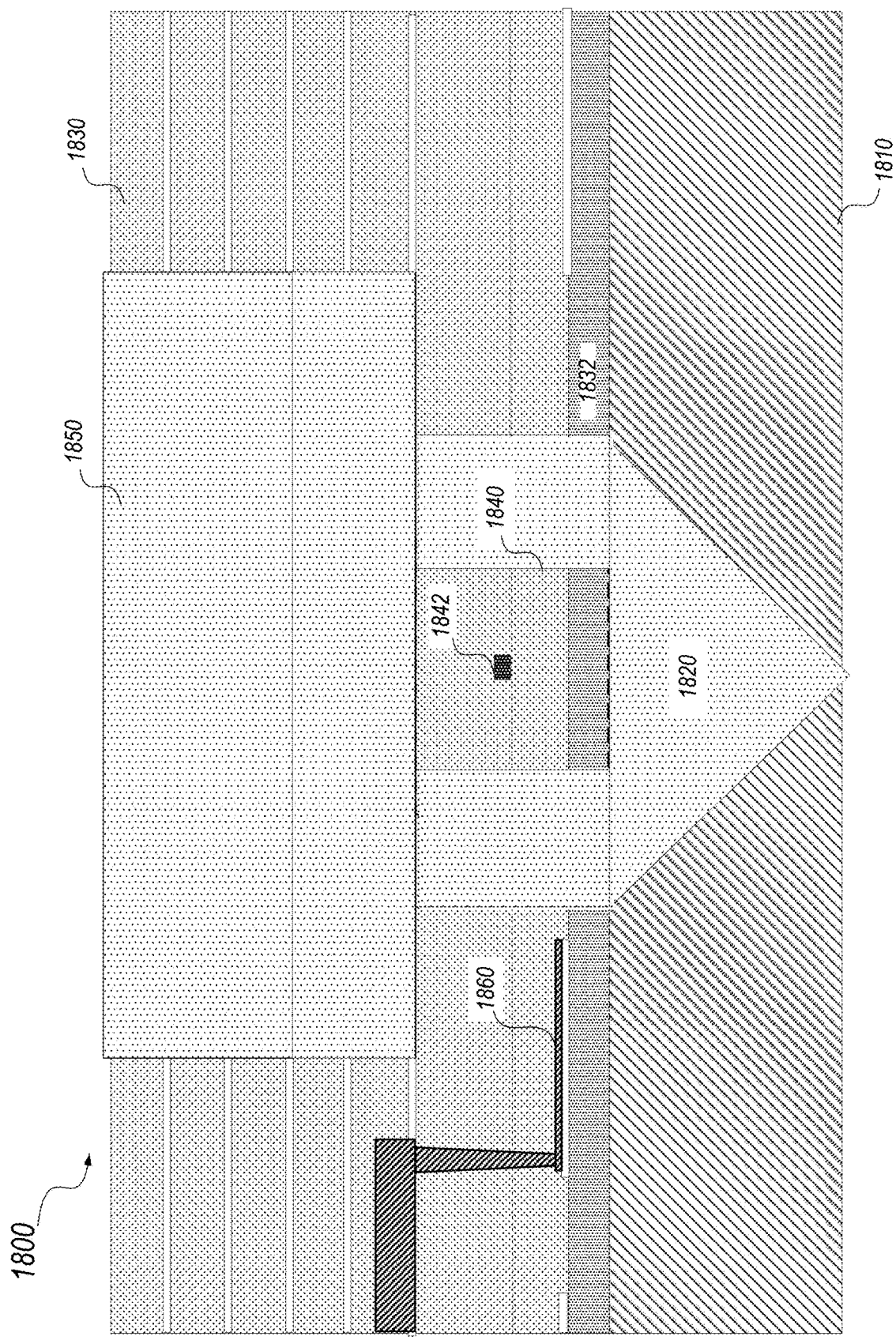
FIG. 18 illustrates an example of a structure including a spot size converter and a heater according to certain embodiments.

FIG. 18 illustrates an example of a structure 1800 including a spot size converter 1840 and a heater 1860 according to certain embodiments. Structure 1800 may be similar to, for example, structure 800, 900, 1000, or 1700 described above. Structure 1800 may include a substrate 1810 and a plurality of oxide layers 1830 formed on substrate 1810. Spot size converter 1840 may be formed in oxide layers 1830 by etching through oxide layers 1830 in some regions and further etching substrate 1810 through an isotropic etching process to form an undercut region 1820. Thus, spot size converter 1840 may include a cantilever portion on top of undercut region 1820. Undercut region 1820 may have a V-shape or a U-shape and may be used as a fiber alignment structure for positioning and aligning an optical fiber. Spot size converter 1840 may include a tapered core 1842 having a higher refractive index than oxide layers 1830, which may be a primary cladding layer for spot size converter 1840. A secondary cladding layer 1850 may be deposited on spot size converter 1840 after an optical fiber is positioned and aligned with spot size converter 1840. Secondary cladding layer 1850 may include an organic or inorganic material having a refractive index slightly lower than the refractive index of oxide layers 1830 as described above. Secondary cladding layer 1850 may surround spot size converter 1840 and may at least partially fill undercut region 1820.

As described above, the coupling efficiency of spot size converter 1840 may be improved by tuning the refractive index contrast between oxide layers 1830 and secondary cladding layer 1850. In some optical quantum computing systems, at least some of the photonic integrated circuits may need to operate at cryogenic temperature (e.g., at about 4K). According to certain embodiments, a heater 1860 (e.g., a Ni—Si heater) may be formed in oxide layers 1830 to control the local temperature at spot size converter 1840, thereby tuning the refractive index of secondary cladding layer 1850 (and/or the primary cladding layer) and thus the refractive index contrast. In the illustrated example, heater 1860 may be formed on a buried oxide layer 1832 formed on substrate 1810 and may be controlled by a controller through metal layers and vias formed in oxide layers 1830.

Figure 19:
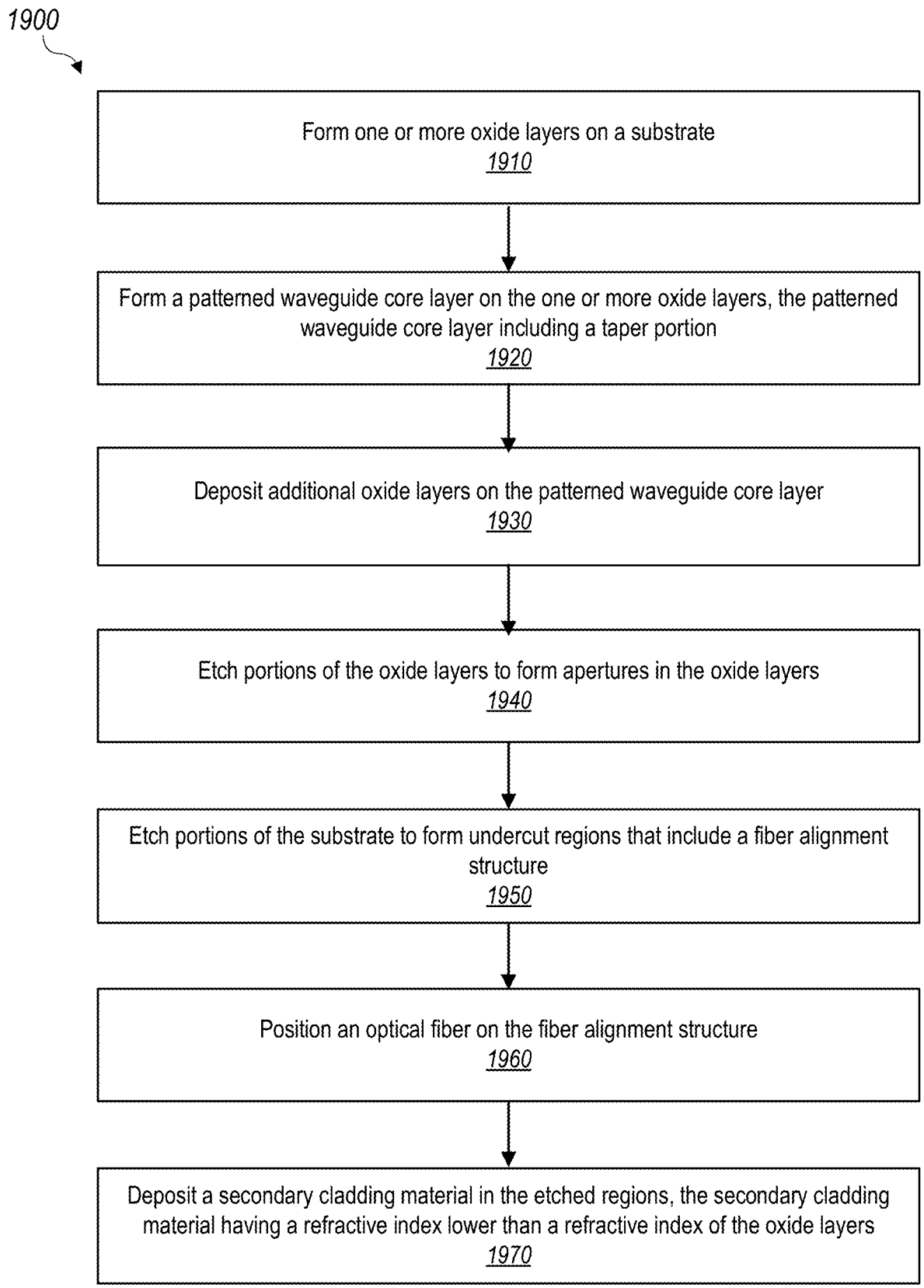
FIG. 19 is a flowchart illustrating an example of a process for fabricating a low-loss spot size converter for optically coupling an optical fiber to an optical waveguide according to certain embodiments.

FIG. 19 is a flowchart 1900 illustrating an example of a process for fabricating a low-loss spot size converter for optically coupling an optical fiber to an optical waveguide according to certain embodiments. It should be appreciated that the specific operations illustrated in FIG. 19 provide a particular process of fabricating a spot size converter for optically coupling two optical components having different optical mode sizes. Other sequences of steps may also be performed according to alternative embodiments. For example, alternative embodiments may perform the operations outlined above in a different order. Moreover, the individual operations illustrated in FIG. 19 may include multiple sub-steps that may be performed in various sequences as appropriate to the individual operation. Furthermore, additional operations may be added or some operations may not need to be performed, depending on the particular applications. One of ordinary skill in the art would recognize many variations, modifications, and alternatives.

Operations at block 1910 may include forming one or more oxide layers on a substrate. The substrate may include, for example, a silicon substrate, and the one or more oxide layers may include silicon oxide. The silicon oxide may be deposited on the substrate, or may be formed on the substrate by oxidizing a layer of the silicon substrate, such as by implanting oxygen ions into the silicon substrate. For example, the one or more oxide layers may include a buried oxide layer. In some embodiments, the silicon oxide may be deposited by high-density plasma chemical vapor deposition (HDP-CVD) of silicon-based dielectric materials, such as tetraorthosilicate (TEOS).

Operations at block 1920 may include forming a patterned waveguide core layer on the one or more oxide layers. The patterned waveguide core layer may include a high refractive index material, such as SiN or Si, and may be formed by depositing a layer of the high refractive index material using various deposition techniques and then patterning the layer of the high refractive index material using photolithography techniques. The patterned waveguide core layer may form the core of waveguides or other photonic integrated circuits described above. The patterned waveguide core layer may include a tapered portion, where the width of the tapered portion may gradually change (increase or decrease), either linearly or nonlinearly.

At block 1930, additional oxide layers may be deposited on the patterned waveguide layer to cover the waveguide layer. As described above, the oxide layers may be deposited, for example, by high-density plasma chemical vapor deposition of silicon-based dielectric materials, such as tetraorthosilicate. The oxide layers above and below the patterned waveguide core layer and the patterned waveguide core layer may form waveguides on the substrate, where the oxide layers may be the primary cladding layer of the waveguides. The oxide layers and the tapered portion of the patterned waveguide core layer may form a spot size converter. In some embodiments, other structures, such as heaters, single photon generators, scattering mitigation structures, switches, photon detectors, and other photonic integrated circuits, may be formed in the oxide layers.

At block 1940, portions of the oxide layers may be etched to form apertures in the oxide layers. For example, a patterned etch mask layer may be formed on the oxide layers and dry or wet etching processes may be performed to remove the exposed portions of the oxide layers. In some embodiments, after the oxide etching, the oxide layers surrounding the tapered portion of the waveguide core layer may have a tapered shape where the width of the oxide layers may gradually increase as shown in, for example, FIG. 9C. In some embodiments, after the oxide etching, the oxide layers surrounding the tapered portion of the waveguide core layer may be constant in one section and may be tapered in another section as shown in, for example, FIG. 10B, 17A, or 17B.

At block 1950, portions of the substrate may be etched to form undercut regions in the substrate. For example, the undercut regions may be formed by isotropic etching (e.g., wet etching) of the substrate through the apertures in the oxide layers. An undercut region may have a V-shape or U-shape and may be used as a fiber alignment structure. The tapered waveguide core layer and the surrounding oxide layers on an undercut region may form a cantilever portion of a spot size converter. As described above with respect to, for example, FIG. 10B, 17A, or 17B, in some embodiments, the oxide layers may be patterned such that some portions of the oxide layers may connect the cantilever portion to other portions of the oxide layers supported by the substrate to provide mechanical support for the cantilever portion.

At block 1960, an optical fiber may be positioned on the fiber alignment structure. Because the fiber alignment structure may align with the cantilever portion of the spot size converter, the optical fiber on the fiber alignment structure may align with the spot size converter as well. In some embodiments, there may be a gap between the tip of the optical fiber and the tip of the cantilever portion.

At block 1970, a secondary cladding material (e.g., an epoxy such as NTT E3810) having a refractive index lower than a refractive index of the oxide layers may be deposited on the cantilever portion of the spot size converter and may fill gaps in the etched regions. The secondary cladding material may be on top and bottom of the cantilever portion or may surround the cantilever portion, and may help to shape (e.g., expand) the optical field of the optical mode in the spot size converter to better match the optical fields of the optical modes in the optical fiber and the waveguides.

Figure 20:
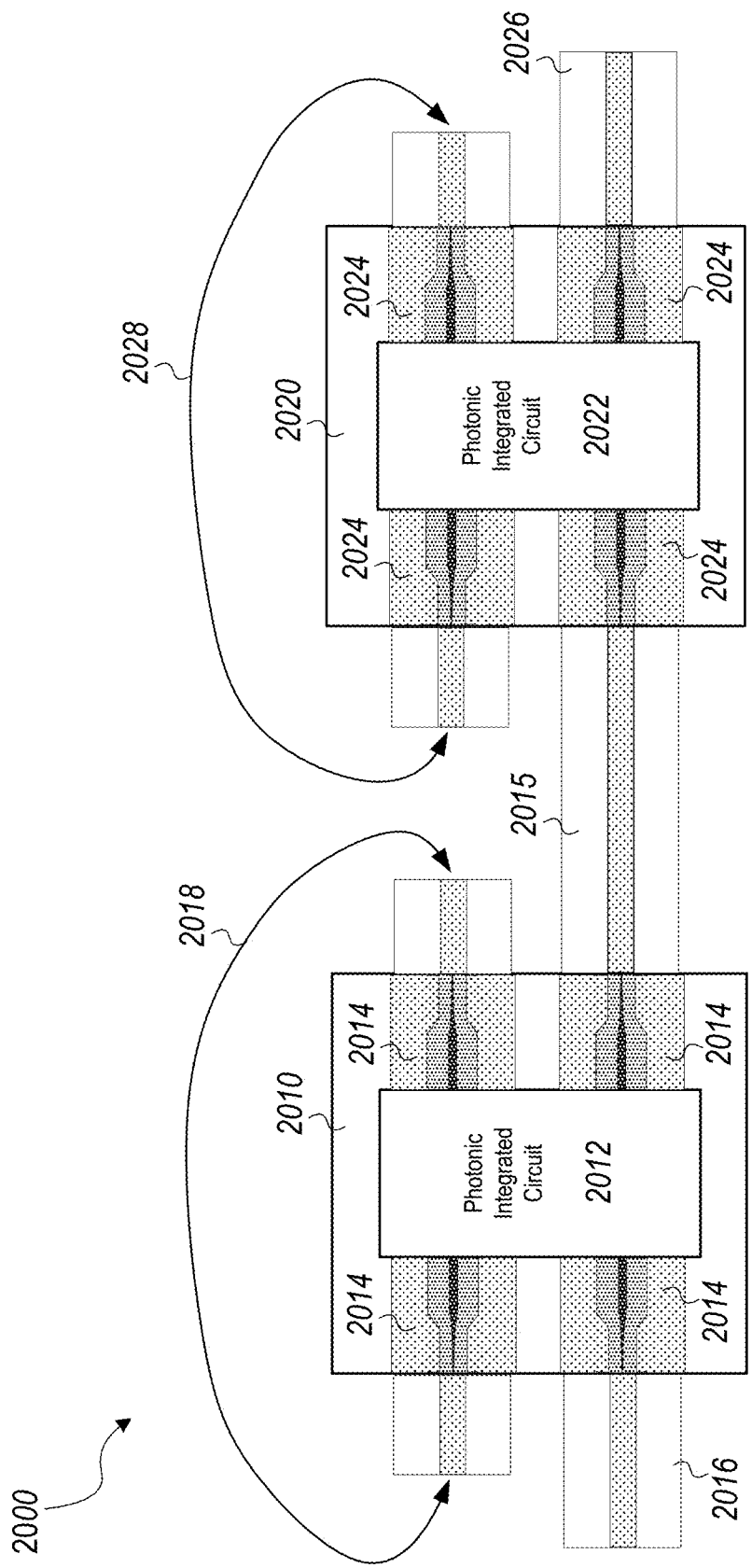
FIG. 20 is a simplified block diagram of an example of a system including two or more dies or wafers according to certain embodiments.

FIG. 20 is a simplified block diagram of an example of a system 2000 including two or more dies or wafers according to certain embodiments. In the illustrated example, a first die 2010 (or a wafer or another module) may include a photonic integrated circuit 2012 that may include, for example, single photon generators, mode couplers, fusion gates, beam splitters, switches, single photon detectors or multi-photon detectors, waveguides, delay lines, modulators, optical switches, ring oscillators, couplers, photodiode-based photodetectors for receiving data and timing signals, and the like, as described above. First die 2010 may also include multiple low-loss spot size converters 2014 optically coupled to photonic integrated circuit 2012. Low-loss spot size converters 2014 may be examples of low-loss spot size converters described above and may be used to couple light from a fiber (e.g., a fiber 2015, 2016, or 2018) to photonic integrated circuit 2012 or from photonic integrated circuit 2012 to a fiber (e.g., fiber 2015, 2016, or 2018). For example, a low-loss spot size converter 2014 may be used to couple light between photonic integrated circuit 2012 and fiber 2016, which may be connected to another die, wafer, or module. Two low-loss spot size converters 2014 may be used to couple light between two portions of photonic integrated circuit 2012 through a fiber 2018.

Similarly, a second die 2020 (or a wafer or another module) may include a photonic integrated circuit 2022 that may include, for example, single photon generators, mode couplers, fusion gates, beam splitters, switches, single photon detectors or multi-photon detectors, waveguides, delay lines, modulators, optical switches, ring oscillators, couplers, photodiode-based photodetectors for receiving data and timing signals, and the like, as described above. Second die 2020 may also include multiple low-loss spot size converters 2024 optically coupled to photonic integrated circuit 2022. Low-loss spot size converters 2024 may be examples of low-loss spot size converters described above and may be used to couple light from a fiber (e.g., fiber 2015, 2026, or 2028) to photonic integrated circuit 2022 or from photonic integrated circuit 2022 to a fiber (e.g., fiber 2015, 2026, or 2028). For example, a low-loss spot size converter 2024 may be used to couple light between photonic integrated circuit 2022 and fiber 2026, which may be connected to another die, wafer, or module. Two low-loss spot size converters 2024 may be used to couple light between two portions of photonic integrated circuit 2022 through a fiber 2028. A low-loss spot size converters 2024 and a low-loss spot size converters 2014 may both be coupled to a fiber 2015, and thus may optically couple photonic integrated circuit 2012 to photonic integrated circuit 2022.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, AAB, ABC, AABBCCC, and the like.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that the claimed subject matter is not limited to the particular examples disclosed, but that such claimed subject matter may also include all aspects falling within the scope of appended claims, and equivalents thereof.

In view of this description, embodiments may include different combinations of features. Implementation examples are described in the following numbered clauses:

Clause 1: A device comprising: a substrate including an optical fiber alignment structure formed thereon; and a spot size converter on the substrate and aligned with the optical fiber alignment structure, the spot size converter having a first end and a second end and including: an oxide layer characterized by a first refractive index, wherein at least a portion of the oxide layer is tapered such that a first width of the oxide layer at the first end of the spot size converter is smaller than a second width of the oxide layer at the second end of the spot size converter; a waveguide core in the oxide layer, wherein the waveguide core is tapered and has a first cross-section at the first end of the spot size converter and a second cross-section at the second end of the spot size converter, the first cross-section being smaller than the second cross-section; and a cladding layer surrounding the oxide layer, the cladding layer having a second refractive index lower than the first refractive index of the oxide layer.

Clause 2: The device of clause 1, wherein a difference between the first refractive index and the second refractive index is between 0.0015 and 0.01.

Clause 3: The device of any one of clauses 1-2, wherein the optical fiber alignment structure includes a V-groove.

Clause 4: The device of any one of clauses 1-3, wherein the waveguide core includes silicon nitride and the oxide layer includes silicon oxide.

Clause 5: The device of any one of clauses 1-4, wherein the cladding layer includes an epoxy.

Clause 6: The device of any one of clauses 1-5, wherein the waveguide core is nonlinearly tapered.

Clause 7: The device of any one of clauses 1-6, wherein the oxide layer includes a section having a constant width.

Clause 8: The device of any one of clauses 1-7, further comprising a heater configured to tune the second refractive index of the cladding layer.

Clause 9: The device of any one of clauses 1-8, further comprising an oxide slab at the first end of the spot size converter, the oxide slab connecting the oxide layer at the first end of the spot size converter to an oxide region supported by the substrate.

Clause 10: The device of any one of clauses 1-9, further comprising a plurality of oxide ribs connecting the oxide layer of the spot size converter to an oxide region supported by the substrate.

Clause 11: The device of any one of clauses 1-10, wherein a height of the oxide layer of the spot size converter is less than 10 m.

Clause 12: The device of any one of clauses 1-11, wherein the first cross-section of the waveguide core at the first end of the spot size converter is less than 0.5×0.5 m2.

Clause 13: The device of any one of clauses 1-12, wherein the spot size converter is on top of an undercut region of the substrate.

Clause 14: The device of any one of clauses 1-13, further comprising an optical fiber positioned on the optical fiber alignment structure and optically coupled to the first end of the spot size converter, wherein the optical fiber is secured to the optical fiber alignment structure by the cladding layer.

Clause 15: The device of clause 14, wherein the optical fiber includes a single-mode optical fiber.

Clause 16: The device of clause 14, wherein the optical fiber includes a multi-mode optical fiber.

Clause 17: The device of any one of clauses 14-16, wherein a center of a fiber core of the optical fiber is vertically offset from a center of the waveguide core at the first end of the spot size converter.

Clause 18: The device of any one of clauses 14-17, wherein a diameter of a fiber core of the optical fiber is smaller than the first width of the oxide layer at the first end of the spot size converter.

Clause 19: The device of any one of clauses 14-18, wherein a coupling efficiency from the optical fiber to the second end of the spot size converter is greater than 95% for both transverse electric mode light and transverse magnetic mode light.

Clause 20: The device of any one of clauses 1-19, wherein the oxide layer includes a photonic integrated circuit formed therein, the photonic integrated circuit optically coupled to the spot size converter and including a routing waveguide, a beam splitter, an optical resonator, a filter, a delay line, a fusion gate, a polarization splitter, a polarization rotator, an optical switch, a single photon detector, a dispersion compensator, a photodetector, or a combination thereof.

Clause 21: A system comprising: a first photonic integrated circuit (PIC) die including: a substrate including an optical fiber alignment structure formed thereon; a single photon generator on the substrate and configured to generate single photons; an optical waveguide on the substrate and configured to transport the single photons; and a spot size converter coupled to the optical waveguide and aligned with the optical fiber alignment structure, the spot size converter having a first end and a second end and including: an oxide layer characterized by a first refractive index; a waveguide core in the oxide layer, wherein the waveguide core is tapered and has a first cross-section at the first end of the spot size converter and a second cross-section at the second end of the spot size converter, the first cross-section smaller than the second cross-section; and a cladding layer surrounding the oxide layer, the cladding layer having a second refractive index lower than the first refractive index of the oxide layer; and an optical fiber including a first fiber end that is positioned on the optical fiber alignment structure and is coupled to the first end of the spot size converter.

Clause 22: The system of clause 21, wherein a difference between the first refractive index and the second refractive index is between 0.0015 and 0.01.

Clause 23: The system of any one of clauses 21-22, wherein at least a portion of the oxide layer of the spot size converter is tapered such that a first width of the oxide layer at the first end of the spot size converter is smaller than a second width of the oxide layer at the second end of the spot size converter.

Clause 24: The system of any one of clauses 21-23, wherein the optical waveguide is configured to transport qubits, qudits, entangled states of qubits, logical qubits, or a combination thereof.

Clause 25: The system of any one of clauses 21-24, wherein the optical fiber alignment structure includes a V-groove.

Clause 26: The system of any one of clauses 21-25, wherein the waveguide core includes silicon nitride; the oxide layer includes silicon oxide; and the cladding layer includes an epoxy.

Clause 27: The system of any one of clauses 21-26, wherein a coupling efficiency between the first fiber end of the optical fiber and the optical waveguide is greater than 95% for both transverse electric mode light and transverse magnetic mode light.

Clause 28: The system of any one of clauses 21-27, wherein the first PIC die further comprises a heater configured to tune the second refractive index of the cladding layer of the spot size converter.

Clause 29: The system of any one of clauses 21-28, wherein the first PIC die further comprises an oxide slab at the first end of the spot size converter, the oxide slab connecting the oxide layer at the first end of the spot size converter to an oxide region supported by the substrate.

Clause 30: The system of any one of clauses 21-29, wherein the first PIC die further comprises a plurality of oxide ribs connecting the oxide layer of the spot size converter to an oxide region supported by the substrate.

Clause 31: The system of any one of clauses 21-30, further comprising a second PIC die, the second PIC die including a second spot size converter coupled to a second fiber end of the optical fiber.

Clause 32: The system of clause 31, wherein the second PIC die includes a routing waveguide, a beam splitter, a filter, a delay line, a fusion gate, a polarization splitter, a polarization rotator, an optical switch, a single photon detector, a dispersion compensator, a photodetector, or a combination thereof.

What is claimed is:

1. A device comprising:
a substrate including an optical fiber alignment structure formed thereon; and
a spot size converter on the substrate and aligned with the optical fiber alignment structure, the spot size converter having a first end and a second end and including:
a first cladding layer characterized by a first refractive index, wherein at least a portion of the first cladding layer is tapered such that a first width of a first end of the first cladding layer at the first end of the spot size converter is smaller than a second width of the first cladding layer at the second end of the spot size converter;
a waveguide core in the first cladding layer, wherein the waveguide core is tapered and has a first cross-section of a first end of the waveguide core at the first end of the spot size converter and a second cross-section at the second end of the spot size converter, the first cross-section being smaller than the second cross-section;
a second cladding layer surrounding the first cladding layer, the second cladding layer having a second refractive index lower than the first refractive index of the first cladding layer; and
a heater configured to tune the second refractive index of the second cladding layer, thereby tuning a refractive index difference between the first cladding layer and the second cladding layer,
wherein the first end of the first cladding layer is aligned with the first end of the waveguide core.

2. The device of claim 1, wherein a difference between the first refractive index and the second refractive index is between 0.0015 and 0.005.

3. The device of claim 1, wherein the optical fiber alignment structure includes a V-groove.

4. The device of claim 1, wherein the waveguide core includes silicon nitride ($SiN_x$) and the first cladding layer includes silicon oxide ($SiO_x$).

5. The device of claim 1, wherein the second cladding layer includes an epoxy.

6. The device of claim 1, wherein the waveguide core is nonlinearly tapered.

7. The device of claim 1, wherein the first cladding layer includes a section having a constant width.

8. The device of claim 1, wherein the heater is configured to tune the refractive index difference at a cryogenic temperature.

9. The device of claim 1, further comprising an oxide slab at the first end of the spot size converter, the oxide slab connecting the first end of the first cladding layer at the first end of the spot size converter to an oxide region supported by the substrate.

10. The device of claim 1, further comprising a plurality of oxide ribs connecting the first cladding layer of the spot size converter to an oxide region supported by the substrate.

11. The device of claim 1, wherein a height of the first cladding layer of the spot size converter is less than 10 μm.

12. The device of claim 1, wherein the first cross-section of the waveguide core at the first end of the spot size converter is less than 0.5×0.5 μm².

13. The device of claim 1, wherein the spot size converter is on top of an undercut region of the substrate.

14. The device of claim 1, further comprising an optical fiber positioned on the optical fiber alignment structure and optically coupled to the first end of the spot size converter, wherein the optical fiber is secured to the optical fiber alignment structure by the second cladding layer.

15. The device of claim 14, wherein the optical fiber includes a single-mode optical fiber.

16. The device of claim 14, wherein the optical fiber includes a multi-mode optical fiber.

17. The device of claim 14, wherein a center of a fiber core of the optical fiber is vertically offset from a center of the waveguide core at the first end of the spot size converter.

18. The device of claim 14, wherein a diameter of a fiber core of the optical fiber is smaller than the first width of the first cladding layer at the first end of the spot size converter.

19. The device of claim 14, wherein a coupling efficiency from the optical fiber to the second end of the spot size converter is greater than 95% for both transverse electric mode light and transverse magnetic mode light.

20. The device of claim 1, further comprising a photonic integrated circuit, the photonic integrated circuit optically coupled to the spot size converter and including at least one of a routing waveguide, a beam splitter, an optical resonator, a filter, a delay line, a fusion gate, a polarization splitter, a polarization rotator, an optical switch, a single photon detector, a dispersion compensator, or a photodetector.

* * * * *